(12) United States Patent
Mertz et al.

(10) Patent No.: US 9,091,862 B2
(45) Date of Patent: Jul. 28, 2015

(54) PARTITIONED APERTURE WAVEFRONT IMAGING METHOD AND SYSTEM

(71) Applicants: Jerome Charles Mertz, Newton, MA (US); Kengyeh Ken Chu, Jamaica Plain, MA (US); Ashwin Parthasarathy, Philadelphia, PA (US)

(72) Inventors: Jerome Charles Mertz, Newton, MA (US); Kengyeh Ken Chu, Jamaica Plain, MA (US); Ashwin Parthasarathy, Philadelphia, PA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 14/237,958

(22) PCT Filed: Jul. 24, 2013

(86) PCT No.: PCT/US2013/051762
§ 371 (c)(1),
(2) Date: Feb. 10, 2014

(87) PCT Pub. No.: WO2014/018584
PCT Pub. Date: Jan. 30, 2014

(65) Prior Publication Data
US 2014/0267674 A1    Sep. 18, 2014

Related U.S. Application Data

(60) Provisional application No. 61/675,113, filed on Jul. 24, 2012.

(51) Int. Cl.
*G02B 21/36* (2006.01)
*G01J 9/00* (2006.01)

(52) U.S. Cl.
CPC *G02B 21/361* (2013.01); *G01J 9/00* (2013.01)

(58) Field of Classification Search
CPC .................................. G02B 21/361; G01J 9/00
USPC .................................. 348/79, 80; 356/121, 233
See application file for complete search history.

(56) References Cited

U.S. PATENT DOCUMENTS

| | | | |
|---|---|---|---|
| 5,912,731 A | 6/1999 | Delong et al. | |
| 5,995,759 A | 11/1999 | Kohayakawa | |

(Continued)

FOREIGN PATENT DOCUMENTS

KR    1020050102177 A    10/2005

OTHER PUBLICATIONS

Ng et al. "Light Field Photography with a Hand-held Plenoptic Camera". CTSR Feb. 2005. 2005, pp. 1-11.*

(Continued)

*Primary Examiner* — Christopher S Kelley
*Assistant Examiner* — Zhihan Zhou
(74) *Attorney, Agent, or Firm* — Nixon Peabody LLP; David F. Crosby

(57) ABSTRACT

A partitioned aperture wavefront imaging system includes an imaging system comprising a partitioned aperture lens array positioned at the aperture plane or Fourier plane between the entrance plane and camera plane of an imaging system. The partitioned aperture lens array can include 2 or more off-axis lenses symmetrically distributed about an optical axis, and adapted to produce simultaneously at the camera plane at least two images of an object, or intermediate image of an object, presented at the entrance plane. Preferably, the partitioned aperture lens array includes from 3 to 5 off-axis lenses and produces 3 to 5 images at the camera plane from which phase and amplitude information about the light field can be determined. The partitioned aperture wavefront imaging system provides enough information about the light field presented at the entrance plane to enable reconstruction of the light field at other planes relative to the entrance plane.

16 Claims, 17 Drawing Sheets

(56) References Cited

U.S. PATENT DOCUMENTS

| | | | |
|---|---|---|---|
| 6,052,180 | A | 4/2000 | Neal et al. |
| 6,133,986 | A | 10/2000 | Johnson |
| 6,264,328 | B1 | 7/2001 | Williams et al. |
| 6,304,540 | B1 * | 10/2001 | Yoo et al. ............... 369/112.01 |
| 6,392,752 | B1 | 5/2002 | Johnson |
| 6,406,146 | B1 | 6/2002 | Lai |
| 6,563,567 | B1 * | 5/2003 | Komatsuda et al. ............ 355/71 |
| 7,006,219 | B2 | 2/2006 | Prelewitz |
| 7,609,388 | B2 | 10/2009 | Arieli et al. |
| 7,723,662 | B2 * | 5/2010 | Levoy et al. ............. 250/208.1 |
| 7,936,392 | B2 * | 5/2011 | Ng et al. ....................... 348/349 |
| 2004/0076319 | A1 | 4/2004 | Fauver et al. |
| 2004/0125230 | A1 | 7/2004 | Suda |
| 2007/0018084 | A1 * | 1/2007 | Shimomura et al. ..... 250/231.13 |
| 2009/0195866 | A1 | 8/2009 | Kawaski et al. |
| 2009/0262182 | A1 * | 10/2009 | Javidi et al. ..................... 348/46 |
| 2012/0019711 | A1 * | 1/2012 | Ng et al. ....................... 348/350 |
| 2012/0076484 | A1 * | 3/2012 | Takada et al. ................ 396/324 |

OTHER PUBLICATIONS

Iglesias et al., "Pyramid phase microscopy", Optics Letters, 36(18):3636-38 (2011).

Ng et al., "Light Field Photography with a Hand-held Plenoptic Camera", CTSR Feb. 2005, 1-11 (2005).

Allen et al., "The Zeiss-Nomarski differential interference equipment for transmitted-light microscopy", A. Wiss. Mikrosk., vol. 69, pp. 193-221, 1969.

Arnison et al., "Linear phase imaging using differential interference contrast microscopy", Journal of Microscopy, vol. 214, Pt. 1, pp. 7-12, 2004.

Barty et al., "Quantitative optical phase microscopy", Opt. Lett., vol. 23, No. 11, pp. 817-819, 1998.

Bernet et al., "Quantitative imaging of complex samples by spiral phase contrast microscopy", Opt. Express, vol. 14, No. 9, pp. 3792-3805, 2006.

Bon et al., "Quadriwave lateral shearing interferometry for quantitative phase microscopy of living cells", Opt. Express, vol. 17, No. 15, pp. 13080-13094, 2009.

Cuche et al., "Simultaneous amplitude-contrast and quantitative phase-contrast microscopy by numerical reconstruction of Fresnel off-axis holograms", Appl. Opt., vol. 38, pp. 6994-7001, 1999.

Ding et al., "Instantaneoous spatial light interference microscopy", Opt. Express, vol. 18, No. 2, pp. 1569-1575, 2010.

Dubois et al., "High-resolution full-field optical coherence tomography with a Linnik microscope", Appl. Opt., vol. 41, No. 4, pp. 805-812, 2002.

Hoffman et al., "Modulation Contrast Microscope", Appl. Opt., vol. 14, No. 5, pp. 1169-1176, 1975.

Kou et al., "Transport-of-intensity approach to differential interference contrast [TI-DIC] microscopy for quantitative phase imaging", Opt. Lett., vol. 35, No. 3, pp. 447-449, 2010.

Leith et al., "Wavefront Reconstruction with Continuous-Tone Objects", J. Opt. Soc. Am., vol. 53, No. 12, pp. 1377-1381, 1963.

Levoy et al., "Light Field Microscopy", ACM Transactions on Graphics, vol. 25, No. 3, Proc. SIGGRAPH, pp. 1-11, 2006.

Lowenthal et al., "Observation of Phase Objects by Optically Processed Hilbert Transform", Appl. Phys. Lett., vol. 11, No. 2, 49-51, 1967.

Mcintyre et al., "Quantitative SLM-based differential interference contrast imaging", Opt. Express, vol. 18, No. 13, pp. 14063-14078, 2010.

Mehta et al., "Quantitative phase-gradient imaging at high resolution with asymmetric illumination-based differential phase contrast", Opt. Lett., vol. 34, No. 13, pp. 1924-1926, 2009.

Novak et al., "Analysis of a micropolarizer array-based simultaneous phase-shifting interferometer", Applied Opt., vol. 44, No. 32, pp. 6861-6868, 2005.

Paganin et al., "Noninterferometric Phase Imaging with Partially Coherent Light", Phys. Rev. Lett., vol. 80, No. 12, pp. 2586-2589, 1998.

Platt et al., "Lenticular Hartmann Screen", Opt. Sci. Newslett., vol. 5, p. 15, 1971.

Popescu et al., "Fourier phase microscopy for investigation of biological structures and dynamics", Opt. Lett., vol. 29, No. 21, pp. 2503-2505, 2004.

Primot et al., "Extended Hartmann test based on the pseudoguiding property of a Hartmann mask completed by a phase chessboard" Applied Opt., vol. 39, No. 31, pp. 5715-5720, 2000.

Shribak et al., "Orientation-Independent Differential Interference Contrast (DIC) Microscopy and Its Combination with Orientation-IndependentPolarization System", J. Biomed. Opt., 13(1):014011, 2008.

Streibl, "Phase imaging by the transport equation of intensity", vol. 49, No. 1, pp. 6-10, 1984.

Stewart, "On differential phase contrast with an extended illumination source", J. Opt. Soc. Am., vol. 66, No. 8, pp. 813-818, 1976.

Waller et al., "Phase from chromatic aberrations" Opt. Express, vol. 18, No. 22, pp. 22817-22825, 2010.

Wang et al., Spatial light interference microscopy (SLIM), Opt. Express, vol. 19, No. 2, pp. 1016-1026, 2011.

Yamaguchi et al., "Phase-shifting digital holography", vol. 22, No. 16, pp. 1268-1270, 1997.

Yi et al., "Graded-field microscopy with white light", Opt. Express, vol. 14, No. 12, pp. 5191-5200, 2006.

Zernike "How I Discovered Phase Contrast", Science, vol. 121, pp. 345-349, 1955.

* cited by examiner

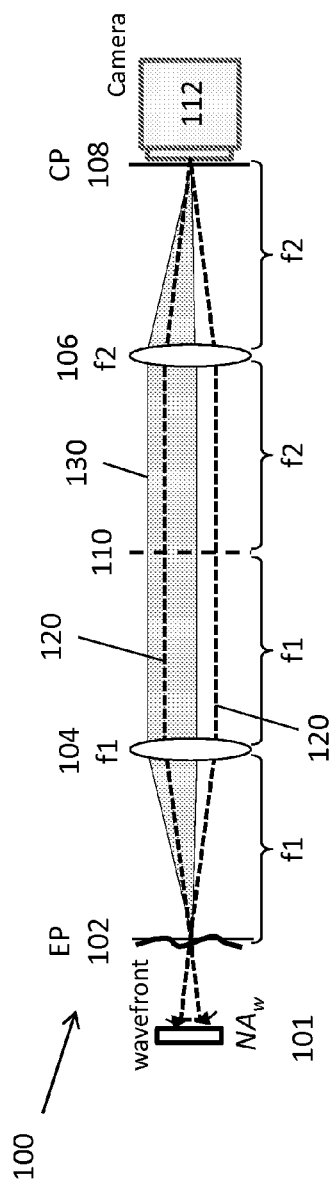
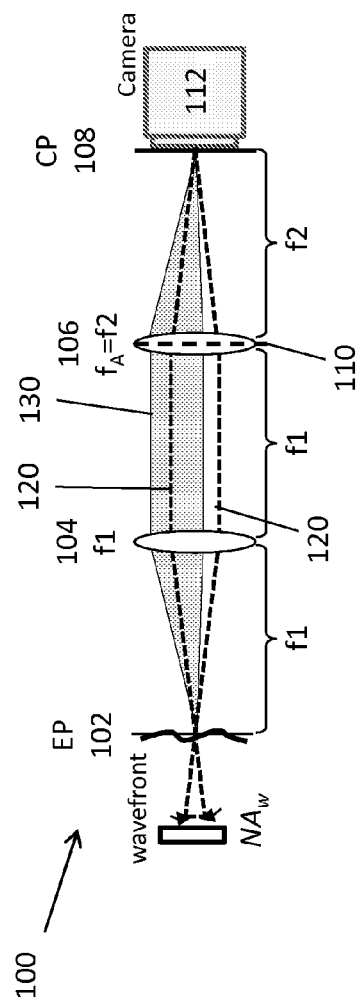
FIG. 1A
*Prior Art*
FIG. 1B
*Prior Art*

PARTITIONED APERTURE WAVEFRONT IMAGING METHOD AND SYSTEM

STATEMENT REGARDING FEDERALLY SPONSORED RESEARCH

This invention was made with US Government support under contract NIH R21-EB013381 awarded by the US National Institutes of Health. The US Government has certain rights in this invention.

CROSS-REFERENCE TO RELATED APPLICATIONS

This application is a 35 U.S.C. §371 National Phase Entry Application of International Application No. PCT/US2013/051762 filed Jul. 24, 2013, which designates the U.S., and which claims benefit under 35 U.S.C. §119(e) of the U.S. Provisional Application No. 61/675,113, filed on Jul. 24, 2012, the contents of each of which are herein incorporated by reference in its entirety their entireties.

REFERENCE TO MICROFICHE APPENDIX

Not Applicable

BACKGROUND

1. Technical Field of the Invention

The present invention is directed to a partitioned aperture wavefront imaging system and a method for measuring amplitude and phase of a light field at a plane. Methods and systems according to the invention enable the production of high resolution images and the ability to reconstruct the light field at other planes displaced from the measurement plane.

2. Description of the Prior Art

Generally, to fully characterize a light field, one must measure the local amplitude and phase of the wavefront. If the light field is roughly collimated, the amplitude and phase vary slowly in space, and only a low spatial resolution measurement is necessary for a complete characterization of the wavefront, referred to as wavefront sensing. On the other hand, if the light field is not well collimated, such as the light field from an extended source, then a high resolution characterization becomes necessary. Such high resolution measurements are generally referred to as wavefront imaging. Wavefront sensors or imagers measure the phase and amplitude of a light field at a particular plane. This not only provides complete information of the light field at the measurement plane, but also enables the numerical reconstruction of the light field at other planes closer to or farther from the measurement plane. The measurement of light amplitude is straightforward. A standard camera (CCD, CMOS or other) is sensitive to the intensity of light, which is proportional to the amplitude squared. Thus, a camera directly provides an amplitude image. The measurement of phase is less straightforward.

However, there are many well-known techniques for imaging phase. For example, many common phase microscopes use either Zernike phase contrast (PC) techniques [1] or Nomarski differential interference contrast (DIC) techniques [2]. One variant if DIC is called PlasDIC, which is available from Carl Zeiss Microscopy, LLC, Thornwood, N.Y. However, these devices only provide non-quantitative images of wavefront phase, meaning that the absolute wavefront phase cannot be retrieved from a single PC or DIC image. PC and DIC microscopes differ in the type of images they produce. PC produces a direct phase image (albeit non-quantitative), whereas DIC produces a phase derivative image (also non-quantitative). Phase gradient images are perhaps more pleasing to the eye because they convey an impression of oblique illumination that gives the images the appearance of 3D relief. A variety of oblique illumination and/or detection techniques also provide phase gradient contrast, but these are also non-quantitative.

Standard Nomarski DIC and Zernike phase contrast (PC) are non-quantitative phase imaging techniques in the sense that it is not possible, from a single DIC or PC image, to distinguish phase from amplitude contributions in the image. It is thus not possible to reconstruct the physical attributes in a sample associated with phase (or amplitude). In contrast, quantitative phase imaging techniques distinguish phase from amplitude, and thus enable an accurate reconstruction of the physical attributes of an image sample associated with phase (examples of such attributes are index of refraction, dry mass, and optical path length).

The development of quantitative phase imaging techniques was largely initiated by the astrophysics community to solve the problem of atmospheric turbulence when imaging with telescopes. Specifically, phase fluctuations caused by atmospheric turbulence can be compensated by a technique called adaptive optics, which requires the use of a wavefront sensor (note: star light impinging a telescope is essentially collimated). The most common wavefront sensors are Shack-Hartmann (SH) sensors [3], which provide 2D phase gradient images. These are popular because they are quantitative, light efficient, exhibit a large dynamic range, and are achromatic. Moreover, fast numerical algorithms have been developed to rapidly convert phase gradient images into absolute (direct) phase images. However, while SH wavefront sensors exhibit exquisite phase resolution, they exhibit poor spatial resolution.

Strategies to combine quantitative phase imaging with high spatial resolution have come from multiple directions. For example, from the microscopy community, a variety of techniques have been developed to render phase imaging, (direct or gradient) quantitative. Examples of direct phase imaging technique usually involve some kind of interferometry with phase stepping. The interferometer reference phase can come from an external beam, as in phase-stepping digital holography (DH) [4], [5], or from a low-pass-filtered version of the wavefront itself, as in Fourier microscopy [6] or SLIM [7]. Alternatively, the interferometry can be in a shear geometry (e.g. qDIC [8], [9]), thus providing quantitative phase gradient imaging (as opposed to direct phase imaging). Variations are Spiral Phase (SP) microscopy, which makes use of a rotating spiral phase plate [10] to obtain phase stepping. A sequence of images with at least 3 phase steps must be acquired to obtain quantitative phase contrast, meaning that image acquisition speed is reduced by a factor of three, and imaging is sensitive to motion artifacts. Single-shot phase stepping can be obtained with off-axis interferometry, as in off-axis DH [11] [12] (the latter is marketed by LyncéeTecDHM) and iSLIM [13], at the cost of reduced spatial resolution. Alternatively, the three (or four) images can be projected simultaneously onto the camera, at the cost of reduced field of view (FOV) and/or resolution (e.g. [9], [14]—note: the latter technique uses polarization-based phase stepping).

As an alternative to interferometric approaches, oblique illumination or detection can also confer phase-gradient contrast (GF [15], DPC [16]). For example, in DPC two images are sequentially acquired with complementary half blocks in the illumination aperture. A subtraction of the two images thus provides phase gradient contrast in a single direction (x).

A second pair of images with the orientation of the half blocks rotated 90 degrees leads to phase gradient contrast in the y direction, thus leading to 2D phase gradient contrast. An absolute phase image can then be obtained by an integration algorithm (to within an integration constant).

Another strategy for phase imaging is based on phase diversity. For example, when a sample is out of focus, phase contrast is revealed as intensity contrast. By acquiring a sequence of at least two images with different focus adjustments, a phase image can be numerical computed based on a variety of algorithms (e.g. [17]). Either the images are acquired sequentially with moving parts (e.g. [18]), or they are acquired simultaneously. For example, simultaneous acquisition can be achieved with two cameras at different focal planes (LyncéeTecDHM), or with the use of a color camera and a reliance on chromatic aberrations [19]. The numerical algorithms in these techniques are fairly sophisticated and sensitive to noise.

Yet another strategy for phase contrast imaging comes from revisiting the SH wavefront sensor. Phasics has marketed a variation of the SH wavefront sensor that provides higher spatial resolution though at the cost of reduced light efficiency and/or reduced dynamic range [20]. More recently, Lytro™ has introduced a new camera to the general public that enables focusing a posteriori after the photo has been taken. The Lytro camera is a plenoptic (or light-field) camera [21], which, essentially, is a SH wavefront sensor with higher spatial resolution. In effect, a plenoptic camera records both the wavefront amplitude and tilt (or phase). The amplitude is encoded in coarse pixel blocks (4×4 in the Lytro camera), whereas the tilt is encoded in the finer intensity variations within the pixel blocks. Note: the size of the pixel block defines the net plenoptic camera spatial resolution (the larger the block, the worse the resolution).

SUMMARY

The present invention is directed to a Partitioned-Aperture Wavefront (PAW) imaging device that includes a partitioned-aperture lens (e.g., a set of lenses of the same focal length offset from the optical axis of the imaging system) located in the aperture or Fourier plane that causes the image at the camera plane to become correspondingly partitioned. In accordance with some embodiments of the invention, the PAW imaging device includes an entrance plane, an entrance lens, a PAW lens and a camera plane. In accordance with some embodiments, the entrance lens has a focal length fe and the PAW lens has a focal length of $f_{PAW}$, and the entrance plane is spaced apart from the entrance lens by fe and the camera plane is spaced apart from the PAW lens by $f_{PAW}$. In accordance with some embodiments of the invention, the entrance lens and the PAW lens can be positioned substantially on the same plane or the lenses can be fabricated such that the principal planes of each lens are offset such that when the entrance lens and the PAW lens are positioned adjacent to one another, the principal planes of the lenses can be aligned. In other embodiments of the invention, the distance between the entrance lens and the PAW lens can be fe, $f_{PAW}$, or some other distance. In other embodiments of the invention, the entrance lens may be dispensed with, and imaging can be performed with only the PAW lens.

In accordance with various embodiments of the invention, the PAW lens can include an array of 2 or more off-axis lenses and the PAW device produces 2 or more simultaneous images at the camera plane according to the number lens in the array. In accordance with some embodiments, the PAW lens can include an array of 2-8 off-axis lenses. In other embodiments of the invention, the PAW lens can include an array of 3-5 off-axis lenses and in one illustrative embodiment of the invention, the PAW lens can include an array 4 off-axis lenses. In accordance with some embodiments, the PAW lens can include a plurality of symmetrically distributed, contiguous, off-axis lenses that are arranged to produce a corresponding plurality of oblique detection images of a wavefront that can be imaged onto and recorded by a single camera in a single camera image.

In accordance with various embodiments of the invention, the PAW imaging device can produce a full image at the camera plane that includes an array of N separate, simultaneously produced images of the object placed at the entrance plane, one produced by each of the lens in the lens array of the PAW lens. A camera, such as a digital camera, can produce a numerical array of pixel values representative of the light intensity values of each image. In accordance with some embodiments of the invention, the local intensity values in the oblique detection images can be used to quantitatively reconstruct both the local phase gradient and the amplitude of the imaged wavefront. In accordance with some embodiments of the invention, the wavefront tilt and amplitude can be determined as a function of the pixel intensity values from two or more images produced by the lenses of PAW lens array. In accordance with some embodiments of the invention, two or more images selected from the image array can be used to determine the local wavefront tilt of light field image and the wavefront tilt can be used to determine the phase gradient of the light field image. Further, in accordance with some embodiments of the invention, the quantitative phase information can be determined by integrating the phase gradient. In accordance with some embodiments of the invention, the image information can be used to produce refocused images for planes at different positions with respect to the entrance plane.

The PAW imaging system according to the invention can record both the wavefront amplitude and tilt, but these are encoded in a specific manner. Rather than dividing the camera sensor into many coarse pixel blocks, the camera sensor can be divided into a few (e.g., 3, 4 or 5) partitions. Amplitude information can be encoded within each partition with single pixel resolution; tilt information can be encoded across different partitions. The PAW imaging system can provide enhanced spatial resolution (for the same number of camera pixels) and simpler optical design. In particular, the PAW imaging system can use higher quality optical lenses because it does not require a lenticular screen as used in prior art devices.

Other advantages of the PAW imaging system according to the invention include that 1) the PAW imaging system uses oblique detection rather than oblique illumination, 2) the PAW imaging system acquires all oblique images simultaneously, 3) the PAW imaging system can be based on a 2f or a 3f or a 3f telecentric imaging geometry, 4) the PAW imaging system can be more light efficient than prior art system, and 5) the PAW imaging system can be implemented in a device that requires no moving parts, 6) the PAW imaging system can be insensitive to light polarization, 7) the PAW imaging system can be achromatic.

In accordance with implementations of the invention, one or more of the following capabilities may be provided. The PAW imaging system according to embodiments of the invention provides a high speed (single shot) and high resolution imaging system that produces quantitative amplitude and phase data about a wavefront. In addition, the PAW imaging system according to the invention can be implemented in a low cost, versatile (can be coupled to existing imaging devices), highly efficient (e.g., light efficient, works with un-collimated light and broadband light) system that provides a high dynamic range in a small robust package.

These and other capabilities of the invention, along with the invention itself, will be more fully understood after a review of the following figures, detailed description, and claims.

BRIEF DESCRIPTION OF THE FIGURES

The accompanying drawings, which are incorporated into this specification, are provided to help illustrate one or more exemplary embodiments of the inventions disclosed herein. Together with the description, the drawing figures serve to explain the principles of the invention and the application of the invention in the various illustrative embodiments. The drawings are illustrative only, and that what is depicted therein can be adapted based on the text of the specification and the spirit and scope of the teachings herein.

In the drawings, where like reference numerals refer to like elements in the

FIGURES

FIG. 1A is a diagram of a prior art 4f telecentric imaging system. FIG. 1B is a diagram of a prior art 3f telecentric imaging system.

Figure 2:
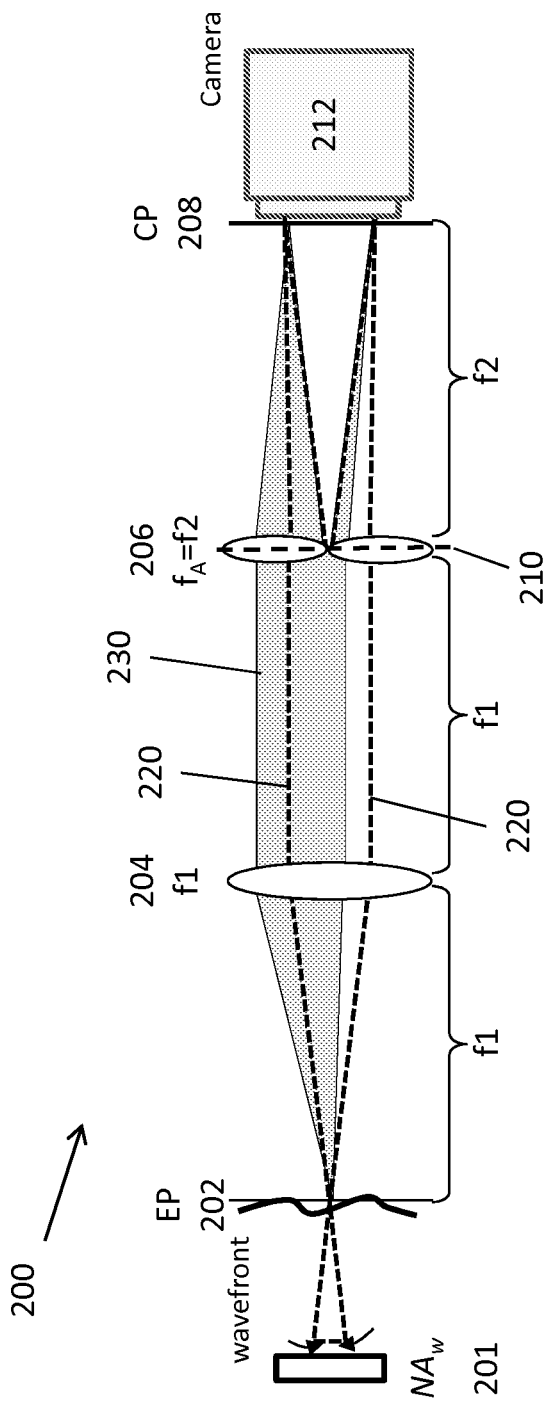

FIG. 2 is a diagram of a 3f PAW imaging system according to one embodiment of the invention.

Figure 3:
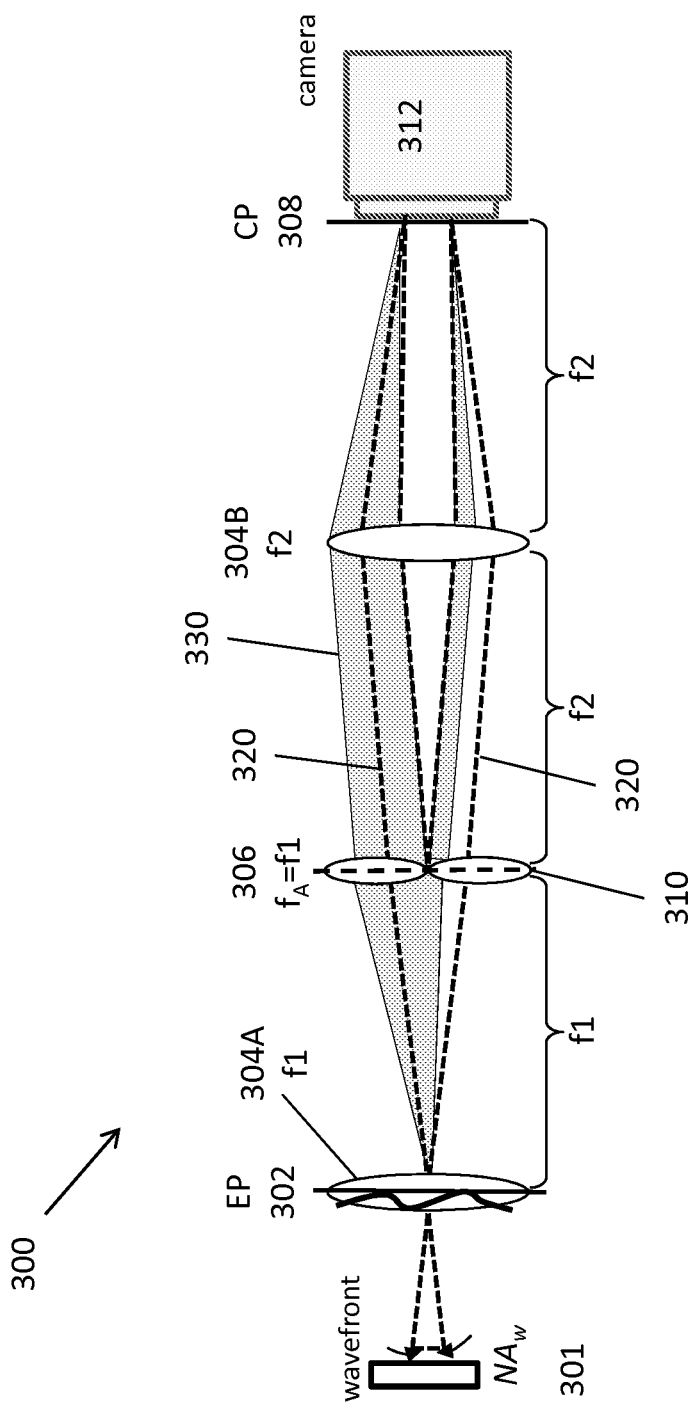

FIG. 3 is a diagram of a 3f telecentric PAW imaging system according to an alternate embodiment of the invention.

Figure 4:
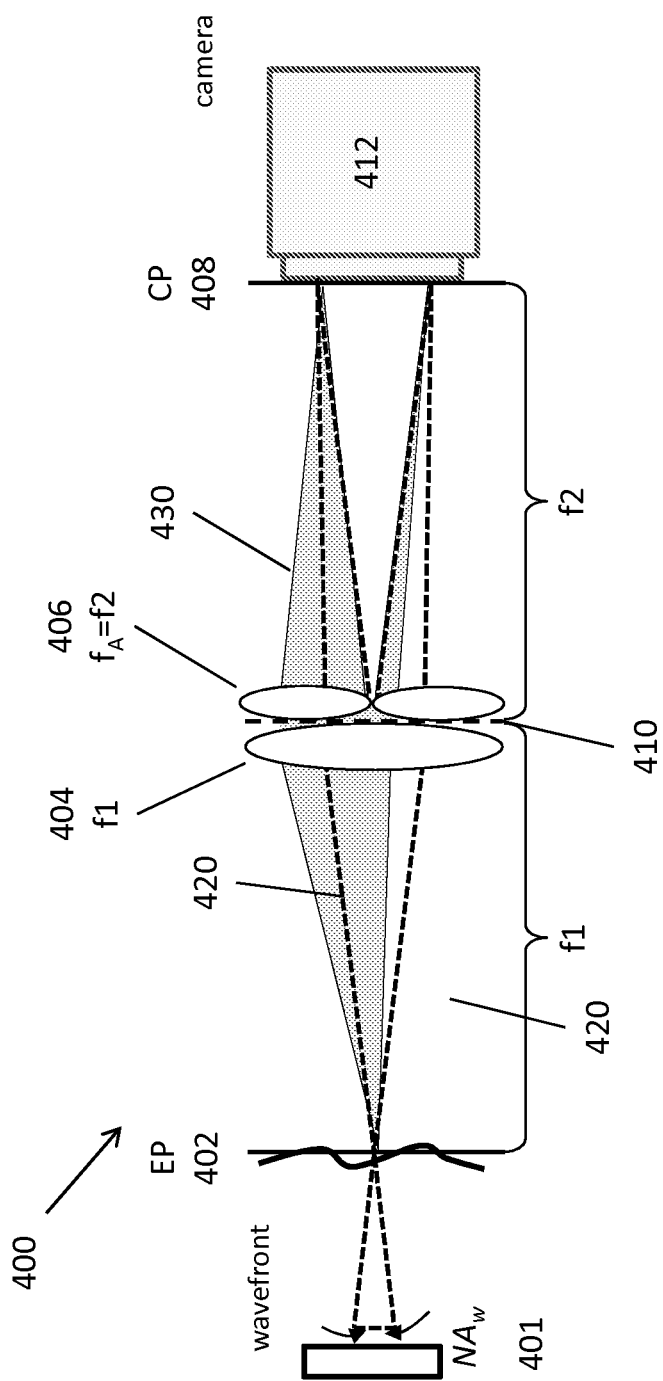

FIG. 4 is a diagram of a 2f PAW imaging system according to one embodiment of the invention.

Figure 5B:
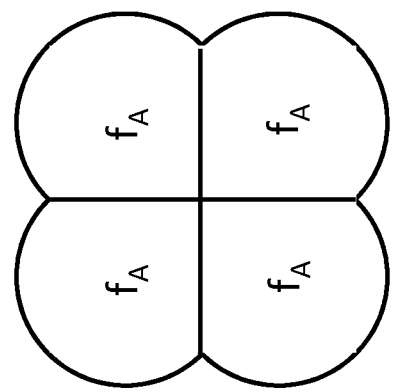
Figure 5A:
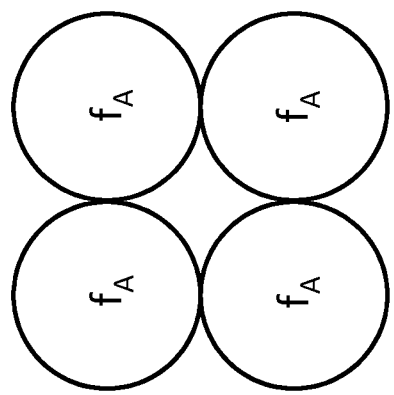

FIGS. 5A and 5B show diagrams of PAW lens arrays according to one embodiment of the invention.

FIGS. 6A, 6B, 6C and 6D show diagrams of PAW lens arrays according to alternate embodiments of the invention.

Figure 7B:
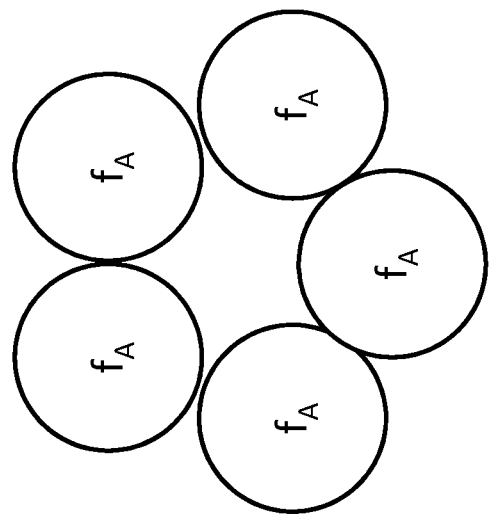
Figure 7A:
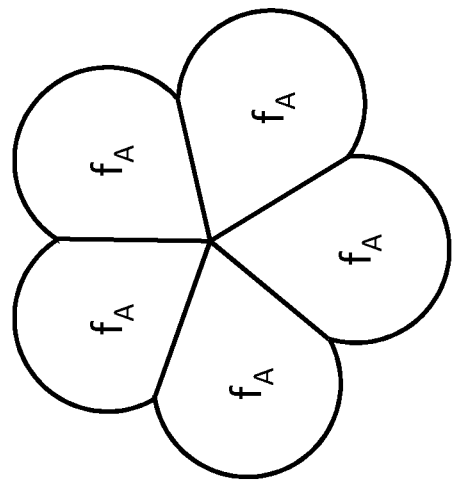

FIGS. 7A and 7B show diagrams of PAW lens arrays according to further embodiments of the invention.

Figure 8A:
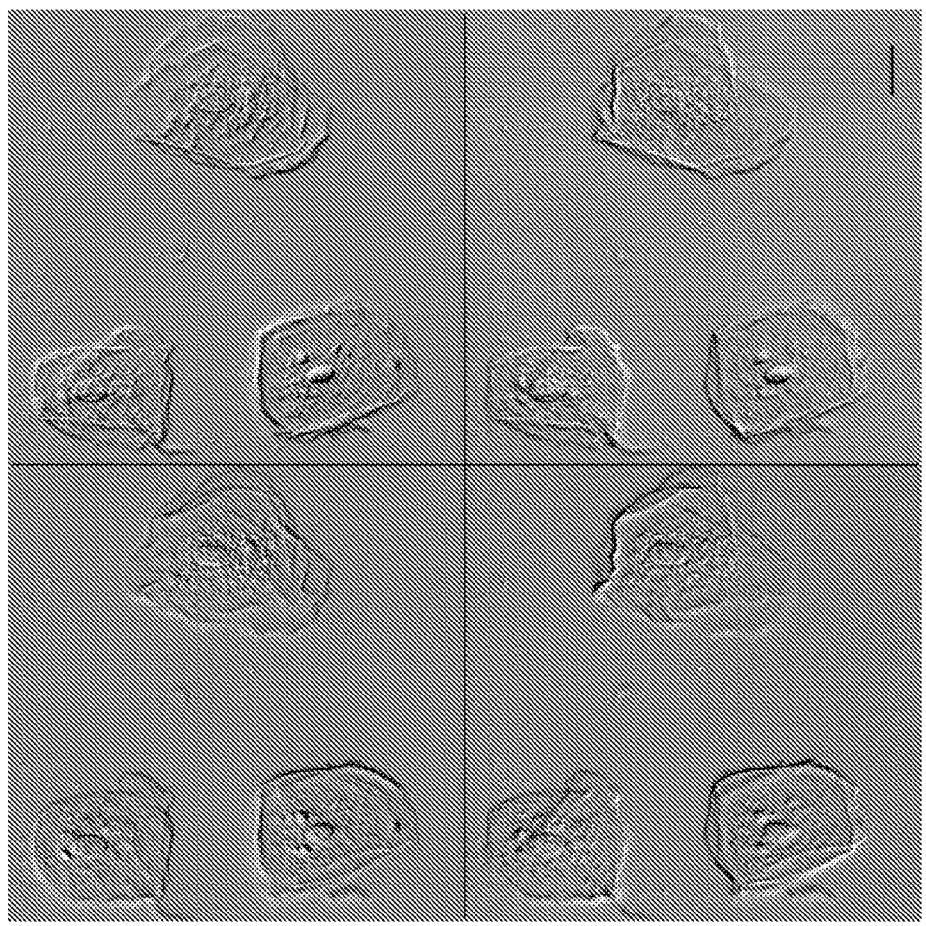

FIG. 8A shows the simultaneously acquired oblique detection images of cheek cells as recorded by the camera (one image per quadrant) using a quatrefoil PAW imaging system according to the invention. Images have been cropped (481× 481 pixels) and co-registered. Scale bar: 20 μm.

Figure 8C:
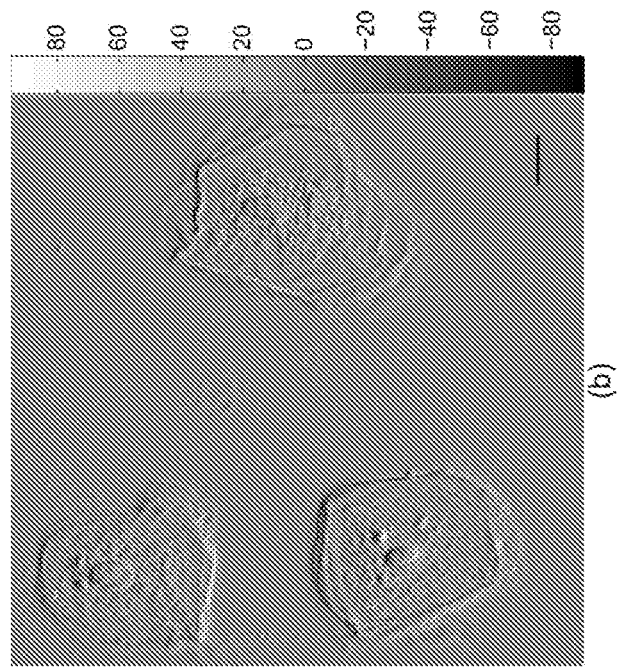
Figure 8B:
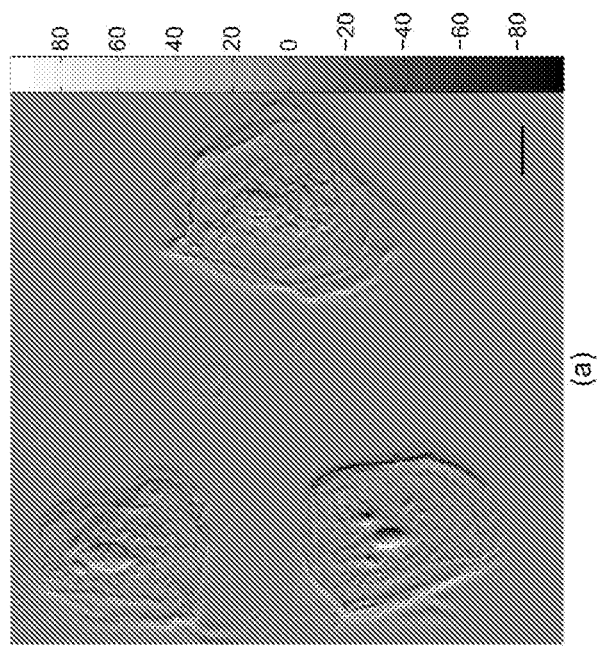

FIGS. 8B and 8C show the quantitative measurement of wavefront tilt angles $\theta_x$ and $\theta_y$, respectively, from cheek cells (milliradians) produced from the images shown in FIG. 8A in accordance with the invention.

Figure 8D:
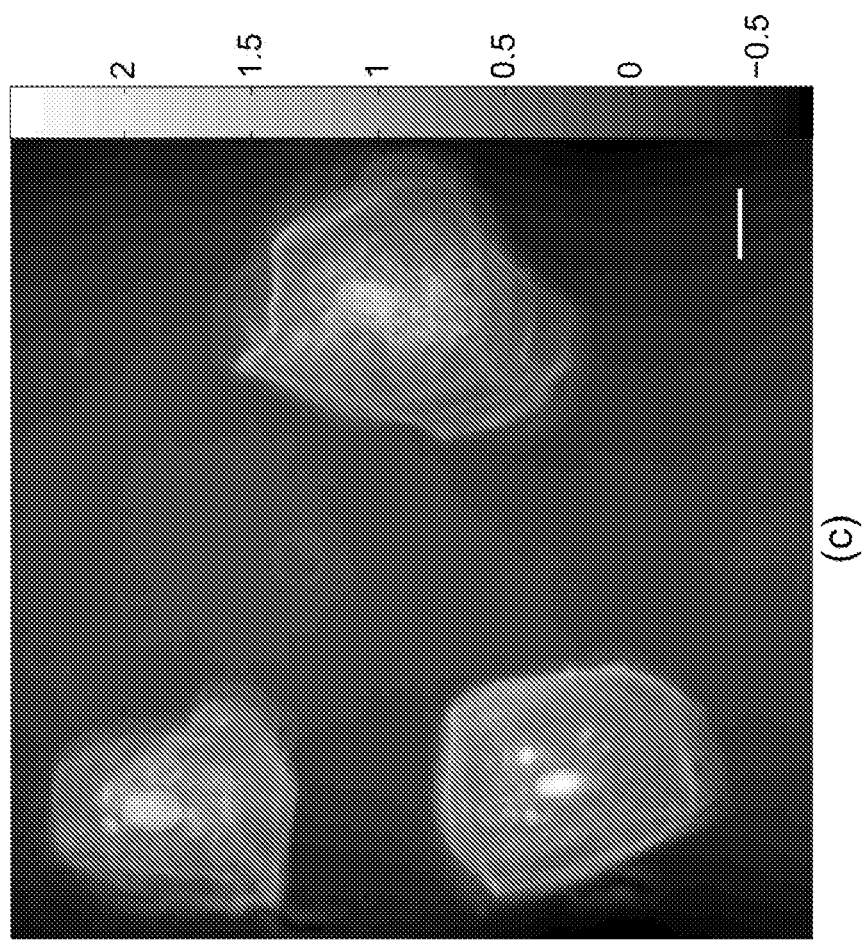

FIG. 8D shows a quantitative reconstructed phase image of the cheek cells (radians) from the measurements shown in FIGS. 8A, 8B and 8C in accordance with the invention. Scale bar: 20 μm.

Figure 9:
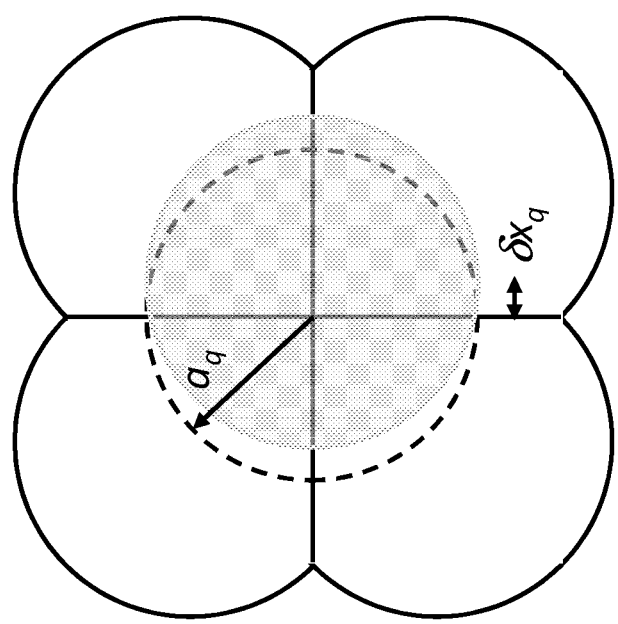

FIG. 9 shows a diagram of beam displacement at the partitioned aperture plane in the quatrefoil configuration, according to one embodiment of the invention.

Figure 10A:
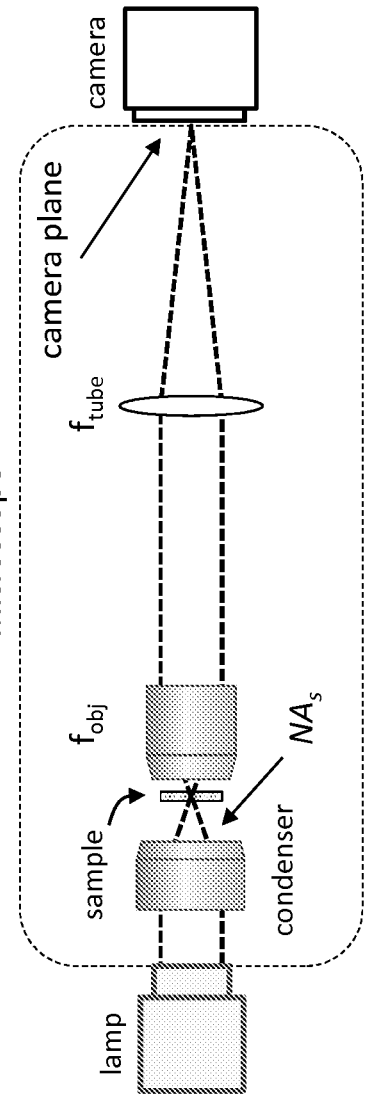
Figure 10B:
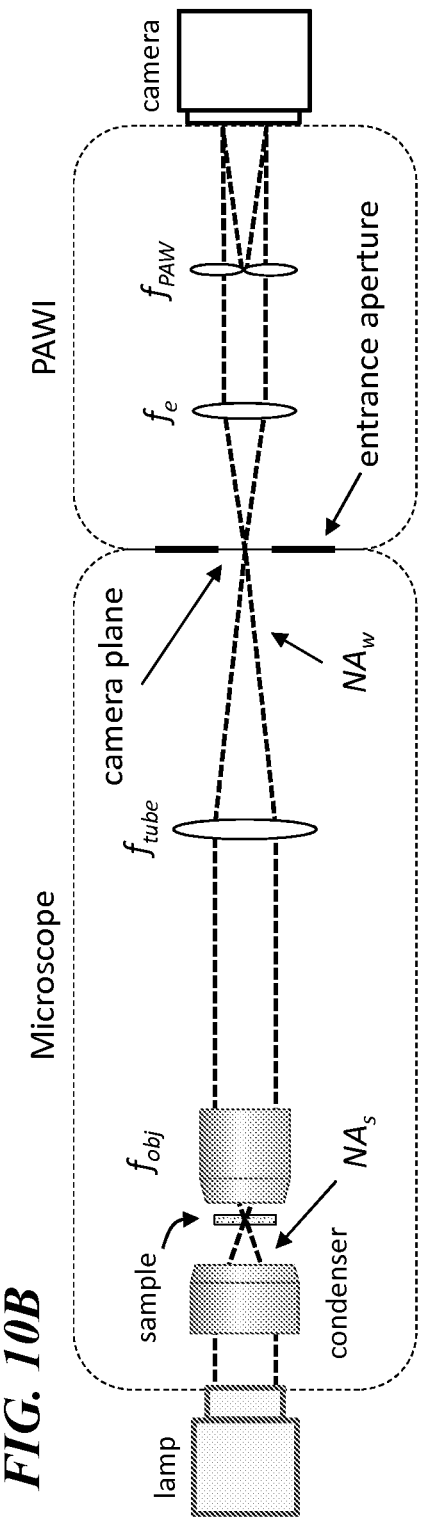

FIG. 10A shows a diagram of a conventional microscope imaging system;

FIG. 10B shows a diagram of the conventional transmission microscope imaging system of FIG. 10A modified to include the PAW imaging system according to an embodiment of the invention.

Figures 10C, 10D:
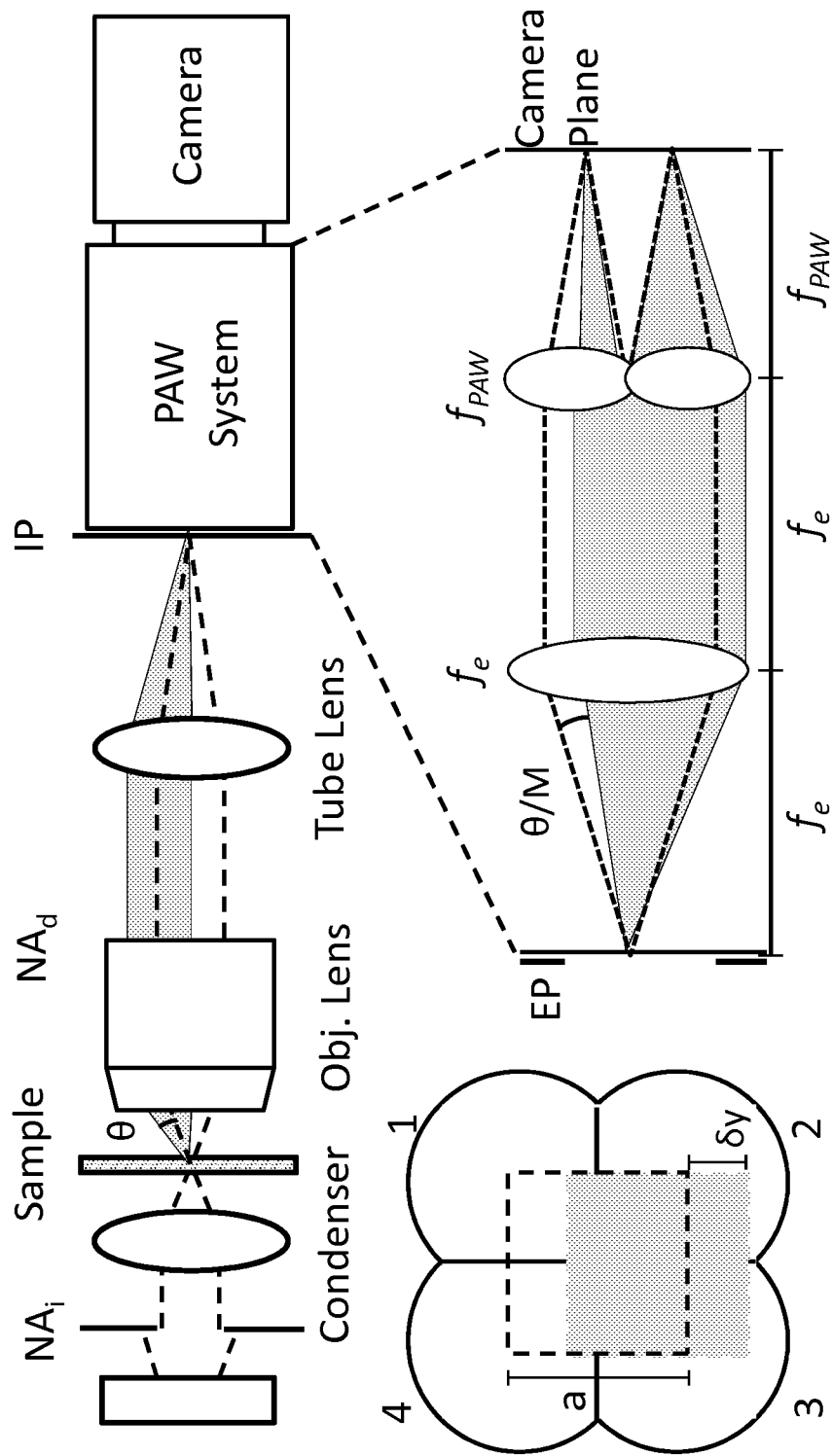

FIGS. 10C and 10D show a diagram of the standard trans-illumination microscope of FIG. 10B combined with a quatrefoil PAW imaging device according to some embodiments of the invention, with a square illumination aperture.

Figure 11:
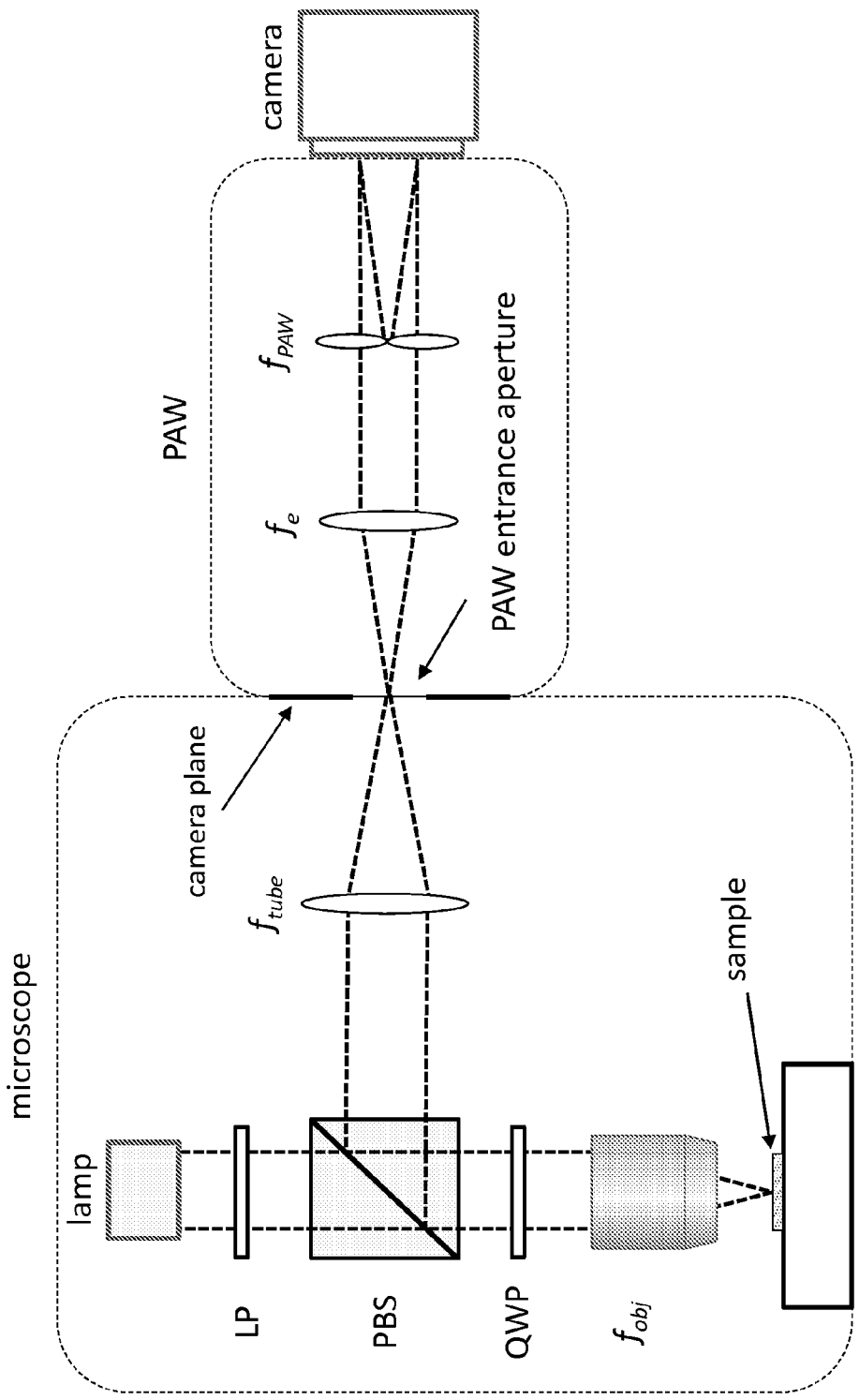

FIG. 11 shows a diagram of the conventional reflection microscope imaging system modified to include the PAW imaging system according to an embodiment of the invention.

Figures 12A, 12B:
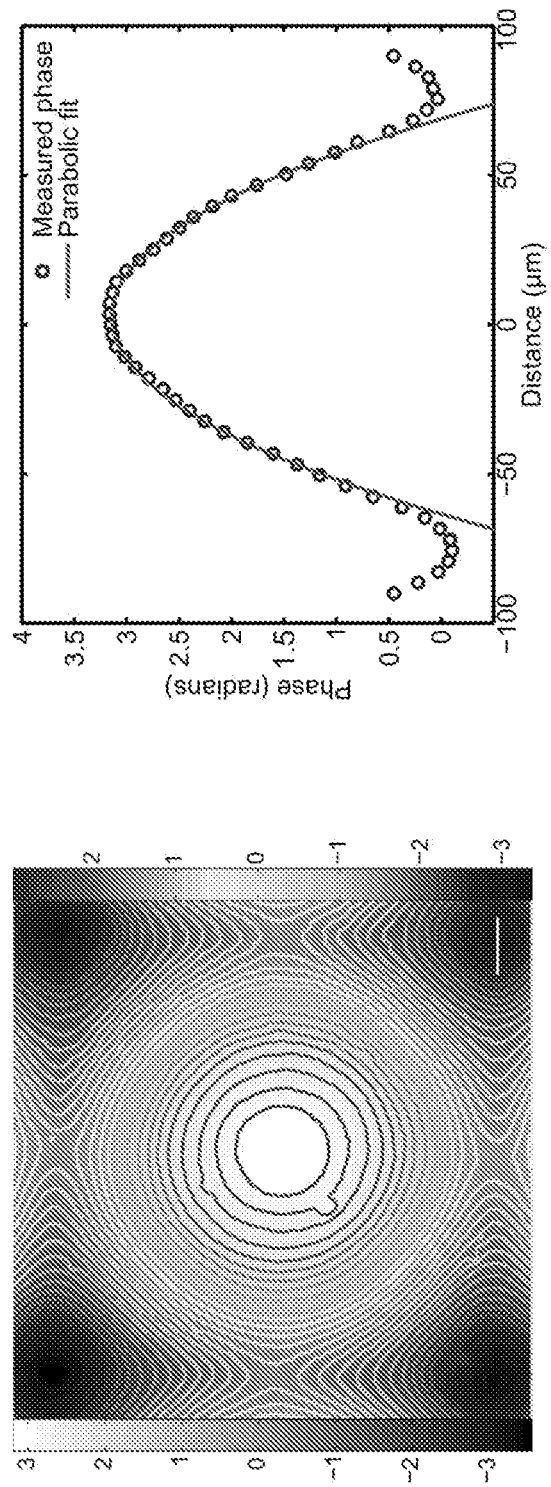

FIG. 12A shows a reconstructed phase image of a lens from a microlens array produced by a PAW imaging system according to the invention and FIG. 12B shows a measured phase profile of a lens from a microlens array.

Figures 13A, 13B, 13C:
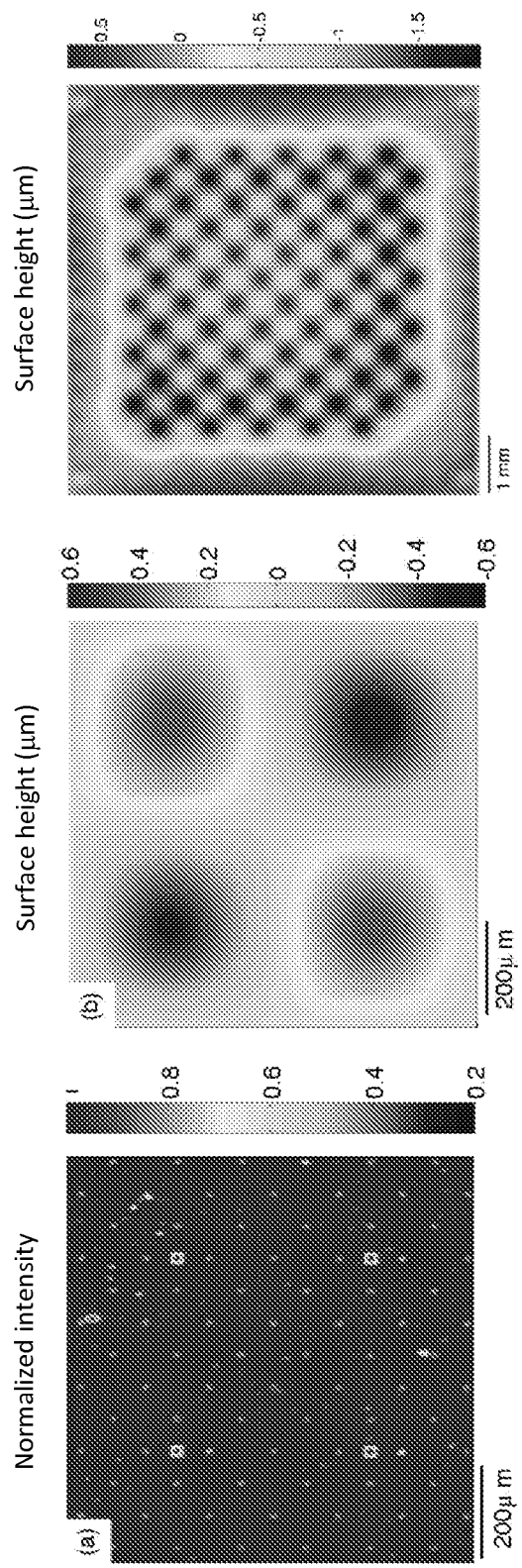

FIGS. 13A, 13B and 13C show a normalized intensity image, a close-up view of a surface height image and wider view of a surface height image produced by PAW microscope according an embodiment of the invention.

Figure 14:
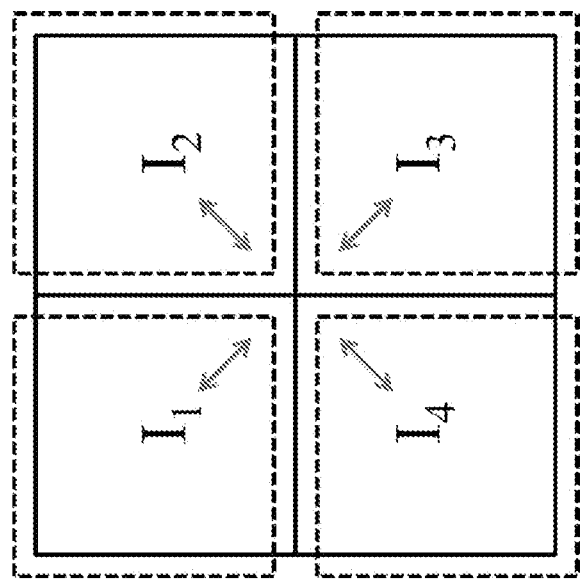

FIG. 14 shows a diagrammatic view of numerical refocusing by shifting the raw images in diagonal directions toward or away from the main optical axis according to some embodiments of the invention.

DETAILED DESCRIPTION OF PREFERRED EMBODIMENTS

It should be understood that this invention is not limited to the particular embodiments, methodologies, or protocols, described herein and as such can vary from the illustrative embodiments provided. The terminology used herein is for the purpose of describing the particular embodiments only, and is not intended to limit the scope of the present invention, which is defined solely by the claims.

As used herein and in the claims, the singular forms include the plural and vice versa unless the context clearly indicates otherwise. Other than in the operating examples, or where otherwise indicated, all numbers expressing quantities used herein should be understood as modified in all instances by the term "about."

All publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The present invention is directed to methods and systems for high resolution wavefront imaging for both the amplitude and the phase gradient (or tilt) of a wave front. In accordance with the invention, the wavefront imaging system includes a partitioned aperture lens positioned in the aperture plane or Fourier plane of the imaging device. In accordance with some embodiments, the imaging system can include a 2f or greater imaging system.

FIGS. 1A and 1B show conventional 4f and 3f imaging systems 100, respectively. The length of the device shown in FIG. 1A is referred to as a 4f or 4 focal length device because the distance between the entrance plane EP 102 and the camera plane CP 108 is 4 focal lengths. The 4f device includes two lenses, 104 f1 and 106 f2 in a spaced apart configuration. Lens 104 f1 has a focal length of f1 and is positioned at a distance of f1 from the entrance plane EP 102. Lens 106 f2 has a focal length of f2 and is positioned at a distance of f2 from the camera plane CP 108. The aperture plane 110 or Fourier plane show as the vertical dashed line located one focal length (f1) from lens 104 f1 and one focal length (f2) from lens 106 f2. Thus, the total distance between the entrance plane EP 102 and the camera plane CP 108 is four focal lengths (f1+f1+f2+ f2). This is also referred to as a telecentric configuration which has the property that image magnification is independent of small sample defocus. FIG. 1B shows a 3f device 100. In the 3f device 100, the second lens 106 is positioned on the aperture plane 110 or Fourier plane (vertical dashed line) and distance between the entrance plane EP 102 and the camera plane CP 108 is three focal lengths (f1+f1+f2).

FIGS. 1A and 1B show a wavefront at the entrance plane EP 102 and a camera at the camera plane CP 108. A point at the wavefront is illuminated with un-collimated light of numerical aperture $NA_w$ and imaged onto a corresponding point on the camera plane CP 108 allowing the camera 112 to record representations of the image. If the wavefront is locally flat, the beam follows the path along the dashed lines 120. If the wavefront is locally tilted, the beam follows the path along the thick gray line 130 defined by the solid lines.

FIGS. 2, 3 and 4 show partitioned aperture wavefront (PAW) imaging systems 200, 300, 400 according to one or more embodiments of the present invention. FIG. 2 shows a 3f PAW imaging system 200 according to some embodiments of the invention. In this embodiment, the entrance lens 204 f1 is positioned one focal length (f1) from the entrance plane EP 202 and the PAW lens array 206 $f_A$ is positioned on the aperture plane 210 or Fourier plane (shown by the vertical dashed line) one focal length (f1) behind the entrance lens 204 f1. The camera plane CP 208 lies one focal length (f2=the focal length of the PAW lens array 206 $f_A$) behind the PAW lens array 206 $f_A$. A point at the wavefront is illuminated with un-collimated light of numerical aperture $NA_w$ and imaged onto a corresponding point on the camera plane CP 208 allowing the camera 212 to record representations of the image. If the wavefront is locally flat, the beam follows the path along the dashed lines 220. If the wavefront is locally tilted, the beam follows the path along the thick gray line 230 defined by the solid lines. In this embodiment, the PAW lens array 206 $f_A$ is partitioned into 4 lenses. The lenses of the PAW lens array 206 can be configured as 4 contiguous lenses (see FIG. 5A) or 4 fused lenses (e.g., a quatrefoil configuration) (see FIG. 5B.) The 4 lenses produce 4 images simultaneously on the camera plane CP 208 and can be captured by the camera 212.

FIG. 3 shows an alternative embodiment of a 3f telecentric PAW imaging system 200 according to the invention. In this embodiment, an entrance lens 304A f1 is positioned on the entrance plane EP 302 and aperture plane 310 or Fourier plane (the vertical dashed line) is located one focal length (f1) behind the entrance lens 304A f1. The PAW lens array 306 is positioned on the aperture plane or Fourier plane (shown by the vertical dashed line) one focal length (f1) behind the entrance lens 304A f1. In this embodiment, second lens 304B f2 positioned one focal length (f2) behind the PAW lens array 306 $f_A$ and the camera plane 308 is located one focal length (f2) behind the second lens 304B f2.

FIG. 4 shows an embodiment of a 2f PAW imaging system 400 according to the invention. In this embodiment, an entrance lens 404 f1 and PAW lens array 406 $f_A$ are both positioned one focal length (f1) from the entrance plane EP 402 on the aperture plane 410 or Fourier plane (shown by the vertical dashed line) and the camera plane CP 408 is located one focal length (f2=the focal length of the PAW lens array 406 $f_A$) behind the aperture plane 410 or Fourier plane (shown by the vertical dashed line). In accordance with some embodiments of the invention, the entrance lens 404 and the PAW lens 406 can be designed and fabricated whereby the principal planes of each lens are offset such that when the entrance lens 404 and the PAW lens 406 are positioned adjacent to one another, the principal planes of the lenses can be aligned with the aperture plane. This configuration provides for a more compact imaging device.

The magnification achieved with the PAW device can be determined from a ratio of the focal lengths of the entrance lens f1 and PAW lens $f_A$ (=f2) or a ratio of the focal lengths of the PAW lens $f_A$(=f1) and the second lens f2. In general, the magnification, $M_{PAW}$, of the PAW imaging system will be:

$$M_{PAW}=f_2/f_1 \qquad (1)$$

Where f2 is the focal length of the second lens and f1 is the focal length of the first lens. This magnification is independent of object defocus.

FIGS. 5A and 5B show examples of different partitioned-aperture lens configurations. In accordance with some embodiments of the invention, the PAW lens array can include N off-axis (e.g., equally displaced from the central axis of the imaging device) lenses. In accordance with various embodiments of the invention, the number of lenses, N, in the PAW lens array can be 2 or greater. As the number of lenses N in the PAW array increases (e.g., beyond 8) the ability of the system to generate high resolution images decreases. In some embodiments according to the invention, PAW lens arrays having 3 to 5 lenses can provide high resolution images. In accordance with some embodiments, N=4 and the PAW lens array can include 4 contiguous lenses or 4 fused lenses (e.g., in a quatrefoil configuration). Each of the lenses can be separated, as shown FIG. 5A, or fused together, as shown in FIG. 5B. In the case where the lenses are separated, a region of the aperture plane about the central or optical axis can be blocked, leading to the possibility of dark field phase contrast imaging. In accordance with some embodiments of the invention, the lenses can be achromatic in order to provide high quality imaging even with relatively broadband light. In accordance with some embodiments of the invention, an entrance aperture of appropriate size can be placed at or near the wavefront plane (or the PAW entrance plane) so as to ensure that the 4 images projected onto the camera plane do not overlap.

Figure 6A:
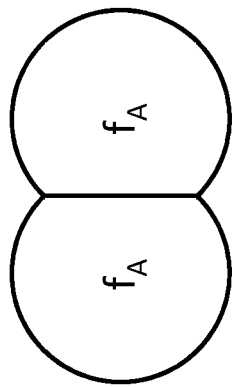
Figure 6B:
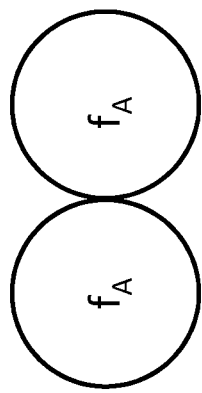
Figure 6C:
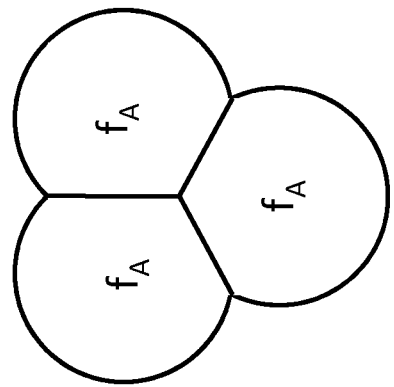
Figure 6D:
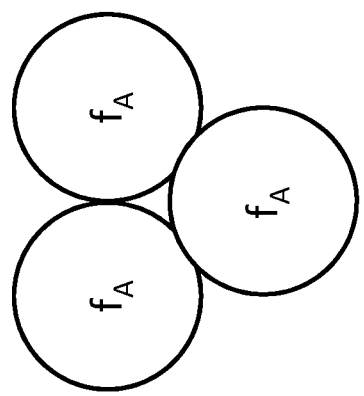

FIGS. 6A-7B show further examples of different partitioned-aperture lens configurations. FIGS. 6A and 6B show a contiguous and a fused 2 lens array configuration, respectively. FIGS. 6C and 6D show a contiguous and a fused 3 lens array configuration, respectively. FIGS. 7A and 7B show a contiguous and a fused 5 lens array configuration, respectively.

In operation, an object (or an intermediate image of an object) is provided at the entrance plane EP and N images of the object are simultaneously produced at the camera plane CP. The camera at the camera plane CP can record each image as an array of pixel data representing the intensity of the light recorded in each image. The set of images includes both amplitude and phase information. The set of N images can be used to determine the tilt and phase gradient of the captured wavefront image. The phase gradient information can be integrated to determine a measure of absolute phase (to within an arbitrary integration constant). Using the phase information, the image can be refocused (e.g. reconstructed) on a range of planes along the axis of the imaging device with respect to the entrance plane.

For purposes of illustration, the operation of PAW imaging system having a 4 lens quatrefoil array will be described. FIG. 8A shows the set of 4 simultaneously acquired oblique detection images of cheek cells (one image per quadrant) produced by the PAW imaging system according to an embodiment of the invention. To recover the amplitude and phase information, the image data can be processed as follows:

Each image can represented by an array $I_n(x, y)$, where $n=0, \ldots, N-1$ (N=the number lenses in the PAW lens array, in this example, N=4), distributed in a counter-clockwise manner. Each of the individual images can be numerically re-centered onto a common origin, where (x, y) are unitless pixel coordinates. The total intensity image can be determined by equation (2).

$$I_T(x, y) = \sum_{n=0}^{N-1} I_n(x, y) \quad (2)$$

The amplitude image, A(x, y), can be generated by: $(x, y) = \sqrt{I_T(x,y)}$.

The complex wavefront tilt image can be determined by equation (3).

$$\tilde{\theta}_w(x, y) = \frac{\Theta}{I_T(x, y)} e^{i\psi_0} \sum_{n=0}^{N-1} I_n(x, y) e^{i2\pi n/N} \quad (3)$$

Where $\psi_0$ is the angle of the 0th image origin relative to the x-axis (in our example, $\psi_0 = \pi/4$). The prefactor $\Theta$ is discussed later. The wavefront tilt is encoded, wherein the real part of $\tilde{\theta}_w$ is in the x direction and the imaginary part of $\tilde{\theta}_w$ is in the y direction as shown in equation (4).

$$\vec{\theta}(x,y) = Re[\tilde{\theta}_w(x,y)]\hat{x} + Im[\tilde{\theta}_w(x,y)]\hat{y} \quad (4)$$

A direct correspondence can be made between the wavefront tilt image and the phase gradient in the wavefront plane as given by equation (5).

$$\vec{\nabla}\phi(x, y) = \frac{2\pi}{\lambda}\vec{\theta}_w(x, y) \quad (5)$$

Where $\bar{\lambda}$ is the mean wavelength.

To synthesize an absolute phase image (to within an integration constant), Fourier derivative theorem can be used. To this end, we define a complex phase gradient as equation (6).

$$G(x,y) = \nabla_x \phi(x,y) + i\nabla_y \phi(x,y) \quad (6)$$

An absolute phase image (setting the arbitrary integration constant C) can then be synthesized by equation (7).

$$\phi(x, y) = Im\left[\mathcal{F}^{-1}\left\{\begin{array}{ll}\frac{\mathcal{F}\{G(x,y) \times FOV\}}{2\pi(\kappa_x + i\kappa_y)} & \kappa_x, \kappa_y \neq 0 \\ C & \kappa_x, \kappa_y = 0\end{array}\right\}\right] \quad (7)$$

Where $\mathcal{F}$ corresponds to a discrete Fourier transform, C is an arbitrary integration constant (set to 0 in this example), and FOV is the image field of view at the entrance plane expressed in physical units (same units as $\lambda$). $\kappa_{x,y}$ correspond to Fourier spatial frequencies, in this example, normalized as a linear ramp from $-N/2$ to $N/2$ (N being the number of image pixels).

The complex wavefront at the entrance plane EP can be determined from equation (8)

$$E(x,y) = A(x,y)e^{i\phi(x,y)} \quad (8)$$

In accordance with some embodiments of the invention, it may not be necessary to calculate the absolute phase and the phase gradient or wavefront tilt, can be used.

In accordance with some embodiments of the invention, the illumination numerical aperture $NA_w$ can be the NA of the light incident at the entrance plane (i.e. the entrance NA). Considering the cone of rays from a particular point on the wavefront plane (without loss of generality, this point can be at the origin). In this example, the PAW lens array includes 4 lenses (N=4) in a quatrefoil geometry as shown in FIG. 9 and the illumination aperture is circular. The projection of the beam spot onto the PAW aperture has radius $a_q = NA_w f_1$. If there is no wavefront tilt at the origin, then the beam spot is centered on the PAW aperture. If there is a wavefront tilt $\theta_w$, then the beam spot is translated a distance $\delta x_q = f_1 \theta_w$ at the PAW aperture (without loss of generality, we have taken $\delta x_q = f_1 \theta_w$ to be along the x direction).

For simplicity, we can assume the magnification, $M_{PAW} = 1$. From geometrical arguments, we can estimate the powers incident on the 4 pixels at the camera associated with the 4 partition origins to be:

$$I_0(0, 0) = \frac{I_T}{4}\left(1 + \frac{\delta x_q}{\eta a_q}\right); I_1(0, 0) = \frac{I_T}{4}\left(1 - \frac{\delta x_q}{\eta a_q}\right);$$

$$I_2(0, 0) = \frac{I_T}{4}\left(1 - \frac{\delta x_q}{\eta a_q}\right); I_3(0, 0) = \frac{I_T}{4}\left(1 + \frac{\delta x_q}{\eta a_q}\right) \quad (9)$$

Where, for a circular illumination aperture (as illustrated in FIG. 9), $\eta = \pi/4$ for $\delta x_q / a_q \ll 1$. For a square illumination aperture $\eta = 1$ for $\delta x_q / a_q \leq 1$.

From equations (2), (3) and (9), we arrive at $$\tilde{\theta}_w(0, 0) = \frac{\Theta}{\sqrt{2}\eta}\frac{\delta x_q}{a_q} = \frac{\Theta}{\sqrt{2}\eta}\frac{\theta_w}{NA_w} \quad (10)$$

The prefactor $\Theta$ can be $\Theta = \sqrt{2}\eta NA_w$ so as to obtain the direct correspondence $\tilde{\theta}_w \leftrightarrow \theta_w$. Note that $\tilde{\theta}_w(0,0)$ is real in this particular example because $\theta_w$ was chosen to be along the x direction. In general $\tilde{\theta}_w(0,0)$ is complex.

The maximum measurable $\theta_w$ occurs when $\delta x_q = a_q$. Hence, the maximum measurable $\theta_w$ is simply $NA_w$. There is no limit to the size of $NA_w$ other than the sizes of the lenses used in the PAW system. This is a useful advantage. The entrance light need not be collimated—indeed, it should not be collimated. This means that PAW works best with extended sources.

Numerical Refocusing

PAW imaging provides images of both wavefront phase and amplitude. With this information, it is possible to numerically refocus the wavefront images a posteriori. Ideally, this is equivalent to changing the physical focus knob on the imaging device without actually changing the knob and without having to acquire new images. A possible way to perform numerical refocusing is to pre-process the raw images by simply shifting them in diagonal directions toward or away from the main optical axis (see example figure below with 4 images). This pre-processing should be done before implementing the PAW phase gradient and amplitude retrieval algorithms. The direction of the shift governs the direction of the refocusing; the extent of the shift governs the extent of the refocus. This simple method of refocusing only has a limited range roughly equal to the Rayleigh range of the imaging optics. Numerical refocusing beyond this range will lead to progressively increased blurring. To mitigate this effect of blurring, standard deconvolution algorithms may be applied to the raw images when pre-processing.

PAW Microscopy

Examples of PAW microscopy are shown in FIGS. 10A, 10B, 10C, 10D and 11. In these embodiments of the invention, PAW can be used as an add-on to a standard wide field microscope to measure the wavefront at the microscope sample plane. The PAW system can be used with a transmission microscope and a reflection microscope.

As shown in FIGS. 10A, 10B, 10C, 10D, the standard transmission microscope consists of a 4f imaging system, of magnification $M=f_{tube}/f_{obj}$, that projects the sample plane onto an intermediate imaging plane, located where the camera sensor is normally placed. The sample can be trans-illuminated by lamp or LED light that can be delivered through a condenser with a numerical aperture defined by $NA_s$, presumed to be in a standard Köhler configuration. The microscope numerical aperture $NA_{obj}$ is typically defined by its objective. The PAW imaging system can be inserted into the standard microscope by placing the PAW entrance aperture at the intermediate imaging plane and moving the camera to PAW camera plane.

As shown in FIG. 11, the standard reflection microscope consists of a 4f imaging system, of magnification $M=f_{tube}/f_{obj}$, that projects the sample plane onto an intermediate imaging plane, located where the camera sensor is normally placed. The sample can be illuminated by lamp or LED light through a beam splitter and the objective lens. To reduce stray back-reflections, the beam splitter can be a polarizing beam splitter PBS, the illumination can be linearly polarized with a linear polarizer LP before going through the polarizing beam splitter, and a quarter-wave plate QWP can be used to convert the linearly polarized light into circularly polarized light. The PAW imaging system can be inserted into the standard microscope by placing the PAW entrance aperture at the intermediate imaging plane and moving the camera to PAW camera plane.

In PAW microscopy, the PAW device entrance plane EP (front principal plane of the entrance lens) can be positioned or inserted where the camera would normally be placed, and the camera can be placed at the exit or camera plane CP of the PAW device (i.e. a focal length f2 behind the exit lens—see FIGS. 10B, 10C and 11). In this manner, the PAW device provides an image of the wavefront at the intermediate image plane. The total magnification from sample to camera can be determined by $M_{total}=M \times M_{PAW}$. In accordance with some embodiments of the invention, a compromise can be made between total magnification and field of view. For example, if $M_{PAW}=1$ then the total magnification remains unchanged but the PAW imaging field of view (FOV) is reduced by a factor of 2 relative to the microscope FOV. Alternatively, if $M_{PAW}=\frac{1}{2}$ then the total magnification is halved but the FOV remains unchanged.

In effect, the microscope simply serves as a relay between the sample plane and the intermediate image plane. Thus $NA_w=NA_s/M$ and $\theta_w=\theta_s/M$, where $\theta_s$ is the wavefront tilt at the sample plane. Besides these transformations, all the above calculations remain the same.

In accordance with some embodiments of the invention, the nonlinearities of the parameter η can be compensated for when using a circular illumination aperture. When using a quatrefoil PAW aperture, for example, if $NA_w$ is distributed in a circular cone, as was assumed above, then η=π/4 for small tilt angles and varies monotonically as a function of $\theta_w$ for larger tilt angles. On the other hand, if $NA_w$ is distributed in a square cone, then η=1 and remains constant for all tilt angles up to the maximum measurable tilt angle (given by $NA_w$). However, when a circular illumination aperture is used, equation (3) with η=π/4 does not represent the true wavefront tilt but rather an approximation thereof. To convert equation (3) to a true representation of the wavefront tilt, the equation must take into account geometric nonlinearities in η. This conversion can be numerically performed with a look-up table. On the other hand, when a square illumination aperture is used (FIG. 10D), the application of a look-up table is largely unnecessary.

In addition, the analysis assumes that the microscope numerical aperture $NA_{obj}$ is large enough that causes no vignetting for all $\theta_s$ less than the maximum measurable $\theta_s$ (i.e. $NA_s$). This implies the assumption that $NA_s \geq \frac{1}{2}NA_{obj}$. If $NA_s$ is larger than this, then the possibility of vignetting can be taken into account in the PAW lookup table used to render $\vec{\theta}_s(x, y)$ quantitative.

In accordance with other embodiments of the present invention, the PAW imaging device can be used in conjunction with a standard 4f bright field microscope as shown in FIG. 10C. A thin sample can be trans-illuminated by an LED (Thorlabs M627L1, λ=627 nm) in a Kohler illumination configuration with a numerical aperture NAi=0.45. The image of the sample can be projected onto an intermediate image plane (the PAW entrance plane) with detection numerical aperture $NA_d$=0.95 (Olympus XLUMPlanFl 20×) and magnification M=22.2. The PAW device provides a further magnification $M_{PAW}=f_{PAW}/f_e$ as shown in FIG. 10C. In our case, the focal lengths $f_{PAW}$ and $f_e$ are both 100 mm and thus $M_{PAW}=1$. We note that, because of our use of a partitioned aperture, the net detection numerical aperture per recorded image is $NA_d/2$.

The numerical processing of images can proceed as follows: Denoting $I_n(x, y)$ as the image recorded in the nth camera quadrant (x, y are pixel coordinates—example images are shown in FIG. 8A), we find, based on geometrical considerations [10] and in the paraxial limit, and based on Eqs. 3, 4 and 10, that the wavefront tilt induced by the sample is given by equation (11).

$$\begin{bmatrix} \theta_x(x, y) \\ \theta_y(x, y) \end{bmatrix} = -\frac{NA_i}{I_T} \begin{bmatrix} I_1 + I_2 - I_3 - I_4 \\ I_1 - I_2 - I_3 + I_4 \end{bmatrix} \quad (11)$$

Where $I_T=\Sigma I_n$ is the bright field image. This expression is similar to that provided in Ref [14] except for the prefactor $NA_i$. This prefactor is useful to making our measurement quantitative. $\vec{\theta}(x, y)$ is the local wavefront tilt in radians, at the sample plane, in the x- and y-directions. When NA, is defined by a square aperture (the case here, inset in FIG. 10D), this tilt is accurate over the full dynamic range of the PAW device (defined below). The negative sign is introduced to account for image inversion by the microscope.

In accordance with some embodiments of the invention, the relation between wavefront tilt and phase gradient is given by equation (12).

$$\vec{\nabla}\phi(x, y) = \frac{2\pi}{\bar{\lambda}}\vec{\theta}(x, y) \quad (12)$$

Where $\bar{\lambda}$ is the mean illumination wavelength. Again, φ is not the phase of the light field but rather the local phase shift, in radians, induced by the sample. Examples of images of the quantitative tilt angles are shown in FIGS. 8B and 8C. These images resemble DIC images, with the difference that they are quantitative rather than qualitative. Specifically, they reveal phase gradients only, since the influence of absorption contrast is canceled in equation (11), at least to first order (an absorption-contrast-only image is provided by $I_T$ [12]).

Some performance characteristics of the system can be deduced from FIG. 10C. The maximum measurable $\theta_{x,y}$ is given by $NA_i$, provided that the condition $NA_d \geq 2NA_i$ is satisfied. In turn, the signal to noise ratio (SNR) of a measurement, from equation (11) and assuming this to be limited by shot noise and camera readout noise $\sigma_r$, is given by equation (13).

$$SNR \approx \frac{\theta_{x,y} I_T}{\sqrt{I_T(NA_i^2 - \theta_{x,y}^2) + 4\sigma_r^2(NA_i^2 + \theta_{x,y}^2)}} \quad (13)$$

Where $I_T$ and $\sigma_r$ are measured in photocounts. We note that since $I_T \propto NA_i^2$ in our setup, a larger NAi is somewhat advantageous. More practically, a larger $NA_i$ is advantageous because it minimizes light power in the vicinity of the optical axis where edge defects in our PAW lens assembly can undermine measurement accuracy.

Finally, because our measurement of $\vec{\nabla}\phi$ is quantitative, we can reliably integrate this to obtain a quantitative measure of phase, $\phi$. While several methods can perform this task, in accordance with one embodiment of the invention, a complex Fourier integration can be used because it is particularly robust [6]. To this end, we define a complex phase gradient $G(x, y) = \nabla_x\phi(x, y) + i\nabla_y\phi(x, y)$. The phase $\phi(x, y)$ is then given by equation (14).

$$\phi(x, y) = \text{Im}\left[\mathcal{F}^{-1}\left\{\begin{array}{ll} \frac{\mathcal{F}\{G(x, y) \times FOV\}}{2\pi(\kappa_x + i\kappa_y)} & \kappa_x, \kappa_y \neq 0 \\ C & \kappa_x, \kappa_y = 0 \end{array}\right\}\right] \quad (14)$$

Where $\mathcal{F}$ corresponds to a discrete Fourier transform, C is an arbitrary integration constant (set to 0 in this example), and FOV is the image field of view at the sample plane expressed in physical units (same units as $\lambda$). $K_{x,y}$ correspond to Fourier spatial frequencies, in this example, normalized as a linear ramp from $-N/2$ to $N/2$ (N being the number of image pixels). As an example, $\phi$ computed from FIGS. 8B and 8C using equation (14) is shown in FIG. 8D.

To verify that PAW imaging is quantitative, a well characterized phase sample can be imaged, in this example, a lens from a microlens array (Thorlabs MLA150-7AR, 150 μm diameter, f=6.7 mm). The quantitative phase image obtained from a single microlens is shown in FIG. 12A, along with a cross-sectional phase profile in FIG. 12B. The maximum phase between the center and the edge of the microlens is measured to be 3.3 radians, which, when compared to the theoretical value of 3.8 radians based on the microlens geometry, yields an 11% discrepancy. The curvature of the parabolic fit in FIG. 12B yields a focal length of 6.72 mm, which is in excellent agreement with manufacturer specifications (6.7 mm). It should be noted that these measurements required no a priori calibration. There are no free parameters and all that was required is a knowledge of $NA_i$ and FOV. The small discrepancy in our measurement of peak phase can be attributed to uncertainties in the actual curvature of the microlens edge or inaccuracies in our assessment of $NA_i$.

FIGS. 13A, 13B and 13C show sample images produced using a reflective microscope using a PAW device according to the invention. The sample was a deformable mirror with an applied checkerboard surface profile. In this embodiment of the invention, the phase corresponds directly to surface height. FIG. 13A shows the normalized light intensity image. FIGS. 13B and 13C show height images derived from phase information. FIG. 13B shows a close-up of a portion of the image, showing only 4 squares of the checkerboard pattern. FIG. 13C shows a wider field of view of the checkerboard sample.

Numerical Refocusing

PAW microscopy provides images of both wavefront phase and amplitude. With this information, it is possible to numerically refocus the wavefront images a posteriori, for example using a computer program executed on a computer or similar device. This is equivalent to changing the physical focus knob on the microscope without actually changing the knob and without having to acquire new images. In accordance with some embodiments of the invention, numerical refocusing can include pre-processing (e.g., using a computer program) the raw images by simply shifting them in diagonal directions toward or away from the main optical axis as shown in FIG. 14. Preferably, this pre-processing can be done before implementing the PAW phase gradient and amplitude retrieval algorithms (e.g., using a computer program). The direction of the shift governs the direction of the refocusing; the extent of the shift governs the extent of the refocus. This simple method of refocusing has a limited range roughly equal to the Rayleigh range of the imaging optics. Numerical refocusing beyond this range can lead to progressively increased blurring. To reduce or eliminate the blurring effect, standard deconvolution algorithms (e.g., using a computer program) can be applied to the raw images when pre-processing.

In accordance with some embodiments of the present invention, the camera can be connected to a computer system, for example, via a wireless (e.g., Blue Tooth or WiFi) or wired (USB, FireWire or Ethernet) connection to transfer image data to memory in the computer system. The computer system can include one or more central processing units (or processors) and associated memories to enable the processor to execute stored programs and process the image data to produce images, such as shown in FIGS. 8A, 8B, 8C, and 8D.

The present invention provides a device and method that utilizes non-interferometric technique to perform quantitative phase contrast imaging. This technique provides many of the same advantages as pyramidal wavefront imaging [14], with the added advantages that it is achromatic (all lenses can be achromats), distortion-free, and does not require a priori calibration. The technique according to the present invention is light efficient and single-shot, making it ideally suited for the observation of dynamic samples. In some embodiments of the invention, the frame rate can be as fast as 5 Hz or higher, the frame rate typically being limited by speed of the camera and the frame transfer rate of the system. In addition, systems and devices according to the invention can be polarization independent, meaning they can be insensitive to sample birefringence. Further, the method and system according to the invention can be incorporated as a passive add-on to standard bright-field microscopes.

The present invention can be implemented and used in accordance with some of the embodiments of the invention. Some embodiments of the present can be defined in any of the following numbered paragraphs.

1. A partitioned aperture wavefront imaging system comprising a partitioned aperture lens array positioned at an aperture (or Fourier) plane of the imaging system between an entrance plane and a camera plane wherein the partitioned aperture lens array includes at least two off-axis lenses symmetrically distributed about an optical axis, and at least two images are simultaneously produced at the camera plane.

2. A partitioned aperture wavefront imaging system according to paragraph 1 further comprising an entrance lens positioned between the entrance plane and the aperture (or Fourier) plane of the system.

3. A partitioned aperture wavefront imaging system according to paragraph 2 wherein the imaging system includes a 3 focal length imaging system.

4. A partitioned aperture wavefront imaging system according to paragraph 1 further comprising an entrance lens positioned at the entrance plane and a second lens positioned between the aperture (or Fourier) plane and camera plane of the system.

5. A partitioned aperture wavefront imaging system according to paragraph 4 wherein the imaging system includes a 3 focal length telecentric imaging system.

6. A partitioned aperture wavefront imaging system according to paragraph 1 further comprising an entrance lens and partitioned aperture lens array both positioned adjacent the aperture (or Fourier) plane of the imaging system.

7 A partitioned aperture wavefront imaging system according to paragraph 6 wherein the imaging system includes a 2 focal length imaging system.

8. A partitioned aperture wavefront imaging system according to paragraph 1 wherein the partitioned aperture lens array includes 3 off-axis lenses symmetrically distributed about an optical axis, and three images are simultaneously produced at the camera plane.

9. A partitioned aperture wavefront imaging system according to paragraph 1 wherein the partitioned aperture lens array includes 4 off-axis lenses symmetrically distributed about an optical axis, and four images are simultaneously produced at the camera plane.

10. A method of producing a quantitative phase image comprising:
    providing a partitioned aperture wavefront imaging system, wherein the partitioned aperture wavefront imaging system includes a partitioned aperture lens array positioned at an aperture plane of the imaging system between an entrance plane and a camera plane, and wherein the partitioned aperture lens array includes at least two off-axis lenses symmetrically distributed about an optical axis;
    providing an object or intermediate image of an object at the entrance plane, and
    producing simultaneously at least two images of the object or intermediate image of the object at the camera plane, and
    producing synthesized images of the tilt and amplitude of the wavefront at the entrance plane that are calculated based on the pixel values of the at least two images recorded by the camera at the camera plane.

11. A method of producing a quantitative phase image according to paragraph 10 wherein the partitioned aperture wavefront imaging system further comprises an entrance lens positioned between the entrance plane and the aperture (or Fourier) plane of the system.

12. A method of producing a quantitative phase image according to paragraph 11 wherein the imaging system includes a 3 focal length imaging system.

13. A method of producing a quantitative phase image according to paragraph 10 wherein the partitioned aperture wavefront imaging system further comprises an entrance lens positioned at the entrance plane and a second lens positioned between the aperture (or Fourier) plane and camera plane of the system.

14. A method of producing a quantitative phase image according to paragraph 13 wherein the imaging system includes a 3 focal length telecentric imaging system.

15. A method of producing a quantitative phase image according to paragraph 10 wherein the partitioned aperture wavefront imaging system further comprises an entrance lens and partitioned aperture lens array both positioned adjacent the aperture (or Fourier) plane of the imaging system.

16 A method of producing a quantitative phase image according to paragraph 15 wherein the imaging system includes a 2 focal length imaging system.

17. A method of producing a quantitative phase image according to paragraph 10 wherein the partitioned aperture lens array includes 3 off-axis lenses symmetrically distributed about an optical axis, and three images are simultaneously produced at the camera plane.

18. A method of producing a quantitative phase image according to paragraph 10 wherein the partitioned aperture lens array includes 4 off-axis lenses symmetrically distributed about an optical axis, and four images are simultaneously produced at the camera plane.

19. A partitioned aperture wavefront microscopy system comprising
    a microscope having a camera plane; and
    a partitioned aperture wavefront imaging system according to any one of paragraphs 1-10;
    wherein the entrance plane of the partitioned aperture wavefront imaging system is positioned at the camera plane of the microscope.

20. A partitioned aperture wavefront microscopy system according to paragraph 19, wherein the microscope is a transmission illuminating microscope.

21. A partitioned aperture wavefront microscopy system according to paragraph 19 wherein the microscope is a reflection illuminating microscope.

22. A partitioned aperture wavefront microscopy system according to any of paragraphs 19-21, further comprising a camera positioned at the camera plane of the partitioned aperture wavefront imaging system.

23. A method of producing a quantitative phase image according to paragraph 10 comprising:
    providing a microscope having a camera plane;
    positioning the entrance plane of the partitioned aperture wavefront imaging system at the camera plane of the microscope.

24. A method of producing a quantitative phase image according to paragraph 23 wherein the microscope is a transmission illuminating microscope.

25. A method of producing a quantitative phase image according to paragraph 23 wherein the microscope is a reflection illuminating microscope.

26. A method of producing a quantitative phase image according to any of paragraphs 23-25 further comprising positioning a camera at the camera plane of the partitioned aperture wavefront imaging system.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

The numbers in brackets ([ ]) above refer to the publications identified below, each of which is incorporated by reference herein, in its entirety.

[1] F. Zernike, "How I discovered phase contrast," *Science*, vol. 121, pp. 345-349, 1955.

[2] R. D. Allen, G. B. David, and G. Nomarski, "The Zeiss-Nomarski differential interference equipment for transmitted light microscopy," Z. Wiss. Mikrosk., vol. 69, pp. 193-221, 1969.

[3] B. Platt and R. V. Shack, "Lenticular Hartmann screen," Opt. Sci. Newslett., vol. 5, p. 15, 1971.

[4] I. Yamaguchi and T. Zhang, "Phase-shifting digital holography," Opt. Lett., vol. 22, pp. 1268-1270, 1997.

[5] A. Dubois, L. Vabre, A. C. Boccara, and E. Beaurepaire, "High resolution full-field optical coherence tomography with a Linnik microscope," Appl. Opt., vol. 41, pp. 805-812, 2002.

[6] G. Popescu et al., "Fourier phase microscopy for investigation of biological structures and dynamics," Opt. Lett., vol. 29, pp. 2503-2505, 2004.

[7] Z. Wang et al., "Spatial light interference microscopy (SLIM)," Opt. Express, vol. 19, no. 2, pp. 1016-1026, 2011.

[8] M. R. Arnison, K. G. Larkin, C. J. R. Sheppard, N. I. Smith, and C. J. Cogswell, "Linear phase imaging using differential interference contrast microscopy," Journal of Microscopy, vol. 214, no. 1, pp. 7-12, 2004.

[9] T. J. McIntyre, C. Maurer, S. Fassl, S. Khan, S. Bernet, and M. Ritsch-Marte, "Quantitative SLM-based Differential Interference Contrast imaging.," Optics express, vol. 18, no. 13, pp. 14063-78, June 2010.

[10] S. Bernet, A. Jesacher, S. Fuerhapter, C. Maurer, and M. Ritsch-marte, "Quantitative imaging of complex samples by spiral phase contrast microscopy," Opt. Express, vol. 14, pp. 3792-3805, 2006.

[11] E. N. Leith and J. Upatnieks, "Wavefront reconstruction with continuous-tone objects," J. opt. Soc. Am., vol. 53, p. 1377, 1963.

[12] E. Cuche, P. Marquet, and C. Depeursinge, "Simultaneous amplitude-contrast and quantitative phase-contrast microscopy by numerical reconstruction of Fresnel off-axis holograms," Appl. Opt., vol. 38, pp. 6994-7001, 1999.

[13] H. Ding and G. Popescu, "Instantaneous Spatial Light Interference Microscopy.," Optics express, vol. 18, no. 2, pp. 1569-75, January 2010.

[14] M. Novak, J. Millerd, N. Brock, M. North-Morris, J. Hayes, and J. Wyant, "Analysis of a micropolarizer array-based simultaneous phase-shifting interferometer," Applied Optics, vol. 44, no. 32, pp. 6861-6868, 2005.

[15] R. Yi, K. K. Chu, and J. Mertz, "Graded-field microscopy with white light," Opt. Express, vol. 14, no. 12, pp. 5191-5200, 2006.

[16] S. B. Mehta and C. J. R. Sheppard, "Quantitative phase-gradient imaging at high resolution with asymmetric illumination-based differential phase contrast.," Optics letters, vol. 34, no. 13, pp. 1924-6, July 2009.

[17] A. Barty, K. A. Nugent, D. Paganin, and A. Roberts, "Quantitative optical phase microscopy," Opt. Lett., vol. 23, pp. 817-819, 1998.

[18] S. S. Kou, L. Waller, G. Barbastathis, and C. J. R. Sheppard, "Transport-of-intensity approach to differential interference contrast (TI-DIC) microscopy for quantitative phase imaging.," Optics letters, vol. 35, no. 3, pp. 447-9, February 2010.

[19] L. Waller, S. S. Kou, C. J. R. Sheppard, and G. Barbastathis, "Phase from chromatic aberrations," Optics Express, vol. 18, no. 22, pp. 447-449, 2010.

[20] J. Primot and N. Gue, "Extended Hartmann test based on the pseudoguiding property of a Hartmann mask," Applied Optics, vol. 39, no. 31, pp. 5715-5720, 2000.

[21] M. Levoy, R. Ng, A. Adams, M. Footer, and M. Horowitz, "Light field microscopy," ACM SIGGRAPH 2006 Papers, vol. 25, no. 3, p. 934, 2006.

[22] R. Hoffman and L. Gross, "Modulation contrast microscopy," Appl. Opt., vol. 14, pp. 1169-1176, 1975.

[23] W. C. Stewart, "On differential phase contrast with an extended illumination source," J. Opt. Soc. Am. 66, 813 (1976).

[24] I. Iglesias, "Pyramid phase microscopy," Opt. Lett. 36, 3636-3638 (2011).

What is claimed is:

1. A partitioned aperture wavefront imaging system comprising:
    a partitioned aperture lens array positioned at an aperture plane of the imaging system between an entrance plane and a camera plane; and
    an entrance lens positioned at either the entrance plane or the aperture plane or a position between the entrance plane and the aperture plane of the imaging system;
    wherein the partitioned aperture lens array includes at least two off-axis lenses symmetrically distributed about an optical axis, and at least two images of an object presented at the entrance plane are simultaneously produced at the camera plane for determination of a tilt and amplitude of the wavefront based on detected object images.

2. A partitioned aperture wavefront imaging system according to claim 1 wherein the imaging system includes a 3 focal length imaging system.

3. A partitioned aperture wavefront imaging system according to claim 1 further comprising an entrance lens positioned at the entrance plane and a second lens positioned between the aperture plane and camera plane of the system.

4. A partitioned aperture wavefront imaging system according to claim 3 wherein the imaging system includes a 3 focal length telecentric imaging system.

5. A partitioned aperture wavefront imaging system according to claim 1 further comprising an entrance lens and partitioned aperture lens array both positioned adjacent the aperture plane of the imaging system.

6. A partitioned aperture wavefront imaging system according to claim 5 wherein the imaging system includes a 2 focal length imaging system.

7. A partitioned aperture wavefront imaging system according to claim 1 wherein the partitioned aperture lens array includes 3 off-axis lenses symmetrically distributed about an optical axis, and three images are simultaneously produced at the camera plane.

8. A partitioned aperture wavefront imaging system according to claim 1 wherein the partitioned aperture lens array includes 4 off-axis lenses symmetrically distributed about an optical axis, and four images are simultaneously produced at the camera plane.

9. A method of producing a quantitative phase image comprising:
    providing a partitioned aperture wavefront imaging system, wherein the partitioned aperture wavefront imaging system includes a partitioned aperture lens array positioned at an aperture plane of the imaging system between an entrance plane and a camera plane, an entrance lens positioned at either the entrance plane or the aperture plane or a position between the entrance plane and the aperture plane of the imaging system, and wherein the partitioned aperture lens array includes at least two off-axis lenses symmetrically distributed about an optical axis;
    providing an object or intermediate image of an object at the entrance plane, and producing simultaneously at least two images of the object or intermediate image of the object at the camera plane, and producing synthesized images of a tilt and amplitude of the wavefront of an object at the entrance plane that are calculated based on the pixel values of the at least two images recorded by the camera at the camera plane.

10. A method of producing a quantitative phase image according to claim 9 wherein the imaging system includes a 3 focal length imaging system.

11. A method of producing a quantitative phase image according to claim 9 wherein the partitioned aperture wavefront imaging system further comprises an entrance lens positioned at the entrance plane and a second lens positioned between the aperture plane and camera plane of the system.

12. A method of producing a quantitative phase image according to claim 11 wherein the imaging system includes a 3 focal length telecentric imaging system.

13. A method of producing a quantitative phase image according to claim 9 wherein the partitioned aperture wavefront imaging system further comprises an entrance lens and partitioned aperture lens array both positioned adjacent the aperture plane of the imaging system.

14. A method of producing a quantitative phase image according to claim 13 wherein the imaging system includes a 2 focal length imaging system.

15. A method of producing a quantitative phase image according to claim 9 wherein the partitioned aperture lens array includes 3 off-axis lenses symmetrically distributed about an optical axis, and three images are simultaneously produced at the camera plane.

16. A method of producing a quantitative phase image according to claim 9 wherein the partitioned aperture lens array includes 4 off-axis lenses symmetrically distributed about an optical axis, and four images are simultaneously produced at the camera plane.

* * * * *